(12) United States Patent
Kawakami et al.

(10) Patent No.: US 10,823,989 B2
(45) Date of Patent: Nov. 3, 2020

(54) BIAS CONTROL CIRCUIT AND BIAS CONTROL METHOD

(71) Applicant: NIPPON TELEGRAPH AND TELEPHONE CORPORATION, Tokyo (JP)

(72) Inventors: Hiroto Kawakami, Yokosuka (JP); Shoichiro Kuwahara, Yokosuka (JP); Akira Hirano, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/629,174

(22) PCT Filed: Jul. 12, 2018

(86) PCT No.: PCT/JP2018/026308
§ 371 (c)(1),
(2) Date: Jan. 7, 2020

(87) PCT Pub. No.: WO2019/013278
PCT Pub. Date: Jan. 17, 2019

(65) Prior Publication Data
US 2020/0133035 A1  Apr. 30, 2020

(30) Foreign Application Priority Data

Jul. 14, 2017  (JP) ................................ 2017-138410

(51) Int. Cl.
*G02F 1/035*   (2006.01)
*G02F 1/03*    (2006.01)

(52) U.S. Cl.
CPC ............ *G02F 1/0327* (2013.01); *G02F 1/035* (2013.01); *G02F 2203/50* (2013.01)

(58) Field of Classification Search
CPC ..... G02F 1/0327; G02F 1/035; G02F 2203/50
(Continued)

(56) References Cited

U.S. PATENT DOCUMENTS

2003/0185575 A1* 10/2003 Ikeuchi ............ H04B 10/50575
398/197
2010/0014874 A1*  1/2010 Kawanishi ......... H04B 10/5563
398/187
(Continued)

FOREIGN PATENT DOCUMENTS

| JP | 5671130 B | 2/2015 |
| JP | 2015-128245 A | 7/2015 |
| JP | 2016218424 A | 12/2016 |

OTHER PUBLICATIONS

Hiroto Kawakami, et al., "Auto Bias Control Technique Based on Asymmetric Bias Dithering for Optical QPSK Modulation", Journal of Lightwave Technology, vol. 30, No. 7, Apr. 2012, pp. 962-968.
(Continued)

*Primary Examiner* — Akm E Ullah

(57) ABSTRACT

A control unit of a bias control circuit performs a loop process that fixes a second bias voltage and iterates a process of recording a pair of a first candidate bias voltage and a second candidate bias voltage that are a first bias voltage when optical power of a multi-level QAM signal output by an optical modulator is controlled so that the optical power converges to a value in the vicinity of the maximum value or the minimum value before and after a third bias voltage is increased or decreased by a half-wave voltage while changing the second bias voltage within a predetermined range. The control unit calculates the difference between the first candidate bias voltage and the second candidate bias voltage for each of a plurality of recorded pairs and determines a value between first candidate bias voltage and the second candidate bias voltage of a pair selected on the basis
(Continued)

of the calculated difference as the value of the first bias voltage.

22 Claims, 14 Drawing Sheets

(58) Field of Classification Search
USPC .............................................................. 385/3
See application file for complete search history.

(56) References Cited

U.S. PATENT DOCUMENTS

2018/0267340 A1* 9/2018 Rohde ................. H04L 27/2096
2018/0267384 A1* 9/2018 Padmaraju ............ G02F 1/0123

OTHER PUBLICATIONS

Hiroto Kawakami, et al., "Auto bias control technique for optical 16-QAM transmitter with asymmetric bias dithering", Optics Express B308, vol. 19, No. 26, Dec. 2011.
Hiroto Kawakami, et al., "Drive-amplitude-independent Auto Bias Control Circuit for QAM Signals and Its Demonstration with an InP-based IQ Modulator", 42nd European Conference and Exhibition on Optical Communications, W4 P1 SC 4, Sep. 2016, pp. 815-817.
International Search Report regarding PCT/JP2018/026308, dated Sep. 25, 2018.

\* cited by examiner

BIAS CONTROL CIRCUIT AND BIAS CONTROL METHOD

CROSS-REFERENCE TO RELATED APPLICATIONS

This application is a 371 U.S. National Phase of International Application No. PCT/JP2018/026308, filed on Jul. 12, 2018, which claims priority to Japanese Application No. 2017-138410, filed Jul. 14, 2017. The entire disclosures of the above applications are incorporated herein by reference.

TECHNICAL FIELD

The present invention relates to a bias control circuit and a bias control method.

BACKGROUND ART

As a transmission code for use in optical transmission systems, a quadrature amplitude modulation (QAM) signal capable of transmitting a large number of optical signals at a low symbol rate has been paid attention. The simplest QAM is a quaternary QAM and is called quadrature phase shift keying (QPSK). Although the present application mainly describes QPSK for simplification, the present application is not restricted to QPSK and can be used for all QAM signals. It is to be noted that the formulas in the following description and the drawings include symbols in which bars are placed over their characters, and the specification represents these symbols by placing their characters after "⁻".

FIG. 6 is a diagram showing an example of a typical construction of an optical transmitter in accordance with a conventional art that generates an $n^2$-ary QAM signal using an optical IQ modulator. For simplification, it is assumed here that complex processing such as pre-dispersion compensation is not performed. CW light (continuous wave light) that has been input to an optical IQ modulator M is divided into two by a first optical coupler 1, and the resultant signals are input to a first optical phase modulation unit 2 and a second optical phase modulation unit 3. Each of the first optical phase modulation unit 2 and the second optical phase modulation unit 3 is usually configured by a Mach-Zehnder interferometer (MZI)-type optical modulator and has a function of relatively changing the optical phase or the optical intensity so as to correspond to the logic of first n-ary data signals Data1 and ⁻Data1 and second n-ary data signals Data2 and ⁻Data2.

After a phase difference $\theta_3$ is applied by an optical phase shifter 4 that has an orthogonal bias electrode 101, to which a third bias voltage to be described below is applied, the output of the first optical phase modulation unit 2 and the output of the second optical phase modulation unit 3 are combined by a second optical coupler 5, and a signal obtained by the combining is output as an $n^2$-ary optical QAM signal. The best optical QAM signal can be obtained when the optical phase difference $\theta_3$ is $-\pi/2$ or $-\pi/2$. This corresponds to a quarter of a carrier wavelength, and because wavelengths are generally of the order of micrometers, the adjustment thereof is quite severe. Moreover, because the optical quality of the optical QAM signal is sensitive to an error in the optical phase shifter 4, it is quite important to adjust the change amount of the phase of the optical phase shifter 4 to a correct value.

In general, the adjustment of $\theta_3$ is performed by adjusting the third bias voltage (orthogonal bias voltage) $V_{bias3}$, which is supplied from a third bias power supply 10 and is applied to the optical phase shifter 4. In FIG. 6, although the optical phase shifter 4 is arranged at the subsequent stage of the second optical phase modulation unit 3, the optical phase shifter 4 may be arranged at the subsequent stage of the first optical phase modulation unit 2, and optical phase shifters may be provided at the subsequent stages of both the first optical phase modulation unit 2 and the second optical phase modulation unit 3. Hereinafter, for simplification of the description, it is assumed that an optical phase shifter is arranged only at the subsequent stage of the second optical phase modulation unit 3.

Next, the relationship between n kinds of values of each of a first n-ary data signal and a second n-ary data signal and the optical phases and optical intensities at the outputs of the first optical phase modulation unit 2 and the second optical phase modulation unit 3 will be described. As described above, MZI-type optical modulators are generally used as the first optical phase modulation unit 2 and the second optical phase modulation unit 3. The first optical phase modulation unit 2 is driven by the first n-ary data signal, and the second optical phase modulation unit 3 is driven by the second n-ary data signal. Each of these data signals is an n-ary signal. A first drive amplifier 6 amplifies the first n-ary data signal to generate the two kinds of signals Data1 and ⁻Data1 having a normal phase and a reverse phase, respectively, and a second drive amplifier 7 amplifies the second n-ary data signal to generate the two kinds of signals Data2 and ⁻Data2 having a normal phase and a reverse phase, respectively.

The amplified n-ary data signals Data1 and ⁻Data1 are respectively applied to two arms of the first optical phase modulation unit 2 via first drive signal electrodes 61a and 61b, thereby causing phase shifts $\pm\varphi_1$ as shown in FIG. 6. Similarly, the amplified n-ary data signals Data2 and ⁻Data2 are respectively applied to two arms of the second optical phase modulation unit 3 via second drive signal electrodes 71a and 71b, thereby causing phase shifts $\pm\varphi_2$ as shown in FIG. 6. The values of the phase delays $\varphi_1$ and $\varphi_2$ vary so as to correspond to the n kinds of values of each of the data signals.

Moreover, a first bias power supply 8 and a first differential output DC amplifier 203 generate DC voltages (data bias voltages) $V_{bias1}$ and $-V_{bias1}$ and further add optical phase shifts $+\theta_1$ and $-\theta_1$ via first data bias electrodes 81a and 81b. Similarly, a second bias power supply 9 and a second differential output DC amplifier 204 generate DC voltages (data bias voltages) $V_{bias2}$ and $-V_{bias2}$, and further add optical phase shifts $+\theta_2$ and $-\theta_2$ via second data bias electrodes 91a and 91b.

Next, notations of the various voltages described above are defined as follows. N kinds of signal levels of a differential signal (Data1−⁻Data1) generated by the first drive amplifier 6 are denoted as $V_0, V_1, \ldots V_m, -V_m, \ldots -V_1, -V_0$, and it is assumed that $V_0$ to $V_m > 0$. Here, m=(n/2)−1. In general, because the optical characteristics of the first optical phase modulation unit 2 are comparable to those of the second optical phase modulation unit 3, it is also assumed that n kinds of signal levels of a differential signal (Data2−⁻Data2) generated by the second drive amplifier 7 are denoted as $V_0, V_1, \ldots V_m, -V_m, \ldots -V_1, -V_0$.

$V_{bias1}$ and $V_{bias2}$ are selected so that each of the first optical phase modulation unit 2 and the second optical phase modulation unit 3 are biased to a null point. That is, $V_{bias1}$ and $V_{bias2}$ are set so that the output light of the first optical phase modulation unit 2 and the output light of the second optical phase modulation unit 3 are extinguished when the differential voltages of the signals generated by the first drive amplifier 6 and the second drive amplifier 7 are zero.

Here, half-wave voltages Vπ of the first optical phase modulation unit 2 and the second optical phase modulation unit 3 will be described with reference to FIG. 6. The first optical phase modulation unit 2 is an MZI-type modulator with two waveguides incorporated therein. When both of the voltages Data1 and ⁻Data1 applied to these two waveguides are zero, the output of the first optical phase modulation unit 2 is extinguished as described above. If the optical output of the first optical phase modulation unit 2 reaches the maximum intensity when Data1 and ⁻Data1 are changed so that Data1=Vx and ⁻Data1=−Vx, 2 Vx is called a half-wave voltage Vπ at RF ports of the first optical phase modulation unit 2. Even when Data1=−Vx and ⁻Data1=Vx, the optical output of the first optical phase modulation unit 2 also becomes maximum; however, in this case, the optical phase of the optical output differs by π from that of the forgoing example. Because the first optical phase modulation unit 2 takes advantage of this property and changes the optical phrase, Data1 and ⁻Data1 are designed so that each of Data1 and ⁻Data1 has a maximum amplitude of 2 Vx=Vπ and (Data1−⁻Data1) has a maximum amplitude of 2 Vπ. An explanation similar to that above is applied to the second optical phase modulation unit 3.

It is to be noted that the optical IQ modulator M shown in FIG. 6 has a structure in which drive signal electrodes apply mutually opposing positive and negative voltages to the two waveguides, and there are four electrodes in total. Such types of optical IQ modulators are called dual-drive types. In contrast, single-drive type optical IQ modulators have only two drive signal electrodes. In such a structure, the first drive signal electrodes simultaneously apply electric fields to the two optical waveguides inside the first optical phase modulation unit 2, and the second drive signal electrodes simultaneously apply electric fields to the two waveguides inside the second optical phase modulation unit 3. Because of the anisotropy of these four optical waveguides, functions similar to those of the dual-drive types can be achieved. Even in such a modulator structure, the n-ary data signals applied to the first drive signal electrodes and the second drive signal electrodes are n kinds of voltages $V_0$, $V_1$, . . . $V_m$, $-V_m$, . . . $-V_1$, $-V_0$, and the amplitude of each of the drive signals is set so as not to exceed twice the half-wave voltage Vπ.

Although the above description describes Vπ at the RF ports (the first drive signal electrodes 61a and 61b and the second drive signal electrodes 71a and 71b), Vπ can also be defined for DC ports, to which the bias voltages are applied. If $V_{bias1}$ is increased, the optical phase $\theta_1$ is also changed, and a change amount of the bias voltage (a change amount $2 \times V_{bias1}$ in the structure of FIG. 6) that is required to increase the optical phase difference ($2 \times \theta_1$ in the structure of FIG. 6) between the optical waveguides by π is Vπ at the DC ports (the first data bias electrodes 81a and 81b). An explanation similar to that above is applied to the second data bias electrodes 91a and 91b. For the orthogonal bias electrode 101, a change in the bias voltage (a change in $V_{bias3}$ in the structure of FIG. 6) that is required to increase the optical phase $\theta_3$ by π is Vπ at the DC port (the orthogonal bias electrode 101).

FIG. 7 shows the relationship among an electric field $E_1$ of the output light of the first optical phase modulation unit 2, $V_0$, $V_1$, . . . $V_m$, $-V_m$, . . . $-V_1$, and $-V_0$, and $V_{bias1}$. Hereinafter, for simplification of the description, the description is limited to QPSK signals, for which n=2 and m=0. When the potential of a drive signal is shown in the horizontal axis and the electric field $E_1$ of output light is shown in the vertical axis, a sinusoidal wave is drawn, and when the data bias voltage $V_{bias1}$ is applied normally, electric fields $E_{11}$ and $E_{12}$ of the output light generated by $V_0$ and $-V_0$ have values that are symmetrical about a zero level as shown by the line denoted by a reference symbol L1 and the points on this line. In contrast, when the data bias voltage $V_{bias1}$ is not appropriate and it deviates by $\Delta V_{bias1}$, electric fields $E_{11}^-$ and $E_{12}^+$ of the output light generated by $V_0$ and $-V_0$ are asymmetric about the zero level as shown by the line denoted by a reference symbol L2 and the points on this line. When the amount of the deviation is $-\Delta V_{bias1}$, electric fields $E_{11}^+$ and $E_{12}^-$ of the output light generate by $V_0$ and $-V_0$ are asymmetric about the zero level as shown by the line denoted by a reference symbol L3 and the points on this line. It is to be noted here that $|E_{11}^-|=|E_{12}^-|$ and $|E_{11}^+|=|E_{12}^+|$.

The relationship among an electric field $E_2$ of the output light of the second optical phase modulation unit 3, $V_0$ and $-V_0$, and $V_{bias2}$ is similar to that of FIG. 7. It is to be noted that although upward slopes are shown in the graph of FIG. 7, downward slopes are acceptable though $E_1$ and $E_2$ must be zero when drive signals are zero. Although the orientation of the slopes is important if signal processing such as pre-dispersion compensation is performed, a description thereof will be omitted here.

When $V_{bias3}$ is applied to the optical phase shifter 4 normally, $\theta_3 = \pi/2$ or $-\pi/2$ is satisfied and the vectors of the optical electric fields of the output light of the first optical phase modulation unit 2 and the output light of the second optical phase modulation unit 3 are maintained to be orthogonal to each other, and thus the constellation of the output light of the optical IQ modulator M has a lattice pattern as shown in FIG. 8. The optical electric field $E_1$ and the optical electric field $E_2$ are an in-phase component and a quadrature component, respectively, and they are sometimes abbreviated as an I component and a Q component, respectively.

By the way, it is known that the optimum values of $V_{bias1}$, $V_{bias2}$, and $V_{bias3}$ fluctuate over time due to a phenomenon called bias drift. It is known that this change over time is large in modulators that use $LiNbO_3$, and is small in semiconductor-type modulators. However, even in semiconductor-type modulators, the optimum values of $V_{bias1}$, $V_{bias2}$, and $V_{bias3}$ depend on the signal wavelength and/or slight manufacturing errors in the optical path lengths of MZIs, and thus they are not uniquely determined. For this reason, in commercial transceivers, it is indispensable to perform auto bias control (ABC). Auto bias control of an optical IQ modulator for generation of a QAM signal can be achieved using asymmetric bias dithering, which is described in detail in Non-Patent Documents 1, 2, and 3.

The operation of a typical bias control circuit in accordance with asymmetric bias dithering will be described using FIG. 9. FIG. 9 is a block diagram showing a structure of an $n^2$-ary QAM transmitter provided with this bias control circuit. In FIG. 9, the same reference symbols as those of FIG. 6 are assigned to the same portions as those of FIG. 6. In asymmetric bias dithering, at least one of $V_0$, $V_1$, . . . , and $V_m$ is set to be smaller than Vπ and low-speed dithering signals of which phases are orthogonal to each other are superposed on $\pm V_{bias1}$ and $\pm V_{bias2}$. Here, the dithering signals respectively applied to $\pm V_{bias1}$ and $\pm V_{bias2}$ are denoted as $\pm \cos(\omega_d \times t)$ and $\pm \sin(\omega_d \times t)$ in accordance with the notation of a double sign in the same order. Here, t denotes time and $\omega_d$ denotes an angular frequency.

This dithering is achieved by a first adder 83 that superposes the dithering signal $\cos(\omega_d \times t)$ output from a first oscillator 82 on the output voltage of the first bias power supply 8 and a second adder 93 that superposes the dithering signal $\sin(\omega_d \times t)$ output from a second oscillator 92 on the output voltage of the second bias power supply 9.

Here, let us consider how the optical power of the modulator output (output light from the optical IQ modulator M) is changed by asymmetric bias dithering when two of $V_{bias1}$, $V_{bias2}$, and $V_{bias3}$ are near their optimum values and the other one shifts from its optimum value due to bias drift. Here, it is assumed that "optical power" represents an averaged value over a period that is much longer than the symbol period of a signal (typical value is 100 picoseconds) and is shorter than the period of the dithering (typical value is 1 millisecond).

As described in detail in Non-Patent Documents 1 to 3, when $V_{bias1}$ is drifting, the optical power of the output of the modulator fluctuates in synchronization with $\cos(\omega_d \times t)$. When $V_{bias2}$ is drifting, the optical power of the output of the modulator fluctuates in synchronization with $\sin(\omega_d \times t)$. When $V_{bias3}$ is drifting, the optical power of the output of the modulator fluctuates in synchronization with $\sin(2\omega_d \times t)$. It is possible to use this property to correct the drift of each of the biases and control the bias voltages.

This control can be achieved as follows. An optical splitter 11 branches the output light of the modulator, and an optical power monitor 12 monitors its optical power. Then, a first synchronous detection circuit 84, a second synchronous detection circuit 94, and a third synchronous detection circuit 103 perform synchronous detection on the obtained value of the optical power. The outputs of the first oscillator 82 and the second oscillator 92 described above and the output of a third oscillator 102 are used as reference clocks for these synchronous detection circuits. Here, the third oscillator 102 outputs sinusoidal waves $\sin(2\omega_d \times t)$. Each of the synchronous detection results obtained by the first synchronous detection circuit 84, the second synchronous detection circuit 94, and the third synchronous detection circuit 103 has a positive value or a negative value that is determined by the magnitude and direction of the drift of each of the biases. These synchronous detection results are fed back, as error signals, to the first bias power supply 8, the second bias power supply 9, and the third bias power supply 10 via a first loop gain adjustment circuit 504, a second loop gain adjustment circuit 505, and a third loop gain adjustment circuit 503, thereby making it possible to maintain the biases at appropriate values.

FIG. 10 shows an example of the output of the first synchronous detection circuit 84 that was obtained by a simulation when only $V_{bias1}$ drifts and shifts from its optimum value (a null point) by an amount of $\Delta V_{bias1}$. $\Delta V_{bias1}$ shown in the horizontal axis is represented in units of $V\pi$. In FIG. 10, multiple zero cross points appear on upward slopes and downward slopes. These two kinds of zero cross points respectively correspond to the maximum value and the minimum value of the output light of the modulator. In this example, a zero cross point at the best $V_{bias1}$ ($\Delta V_{bias1}=0$) appears on an upward slope; however, the direction of the slope depends on the modulation format and the drive amplitude. The detailed discussion thereof is given in Non-Patent Document 2. It is possible to always maintain $V_{bias1}$ at the optimum value by configuring a feedback loop using the first loop gain adjustment circuit 504 so that $V_{bias1}$ is decreased if the output of the first synchronous detection circuit 84 is positive and $V_{bias1}$ is increased if the output of the first synchronous detection circuit 84 is negative. It is to be noted that although upward zero cross points appear also at $\Delta V_{bias1} = \pm 2 V\pi$, this is due to the periodicity of the MZIs, and the best QAM signal can be obtained even when the feedback loop converges to one of these values.

An explanation similar to that above is applied to a case in which only $V_{bias2}$ drifts. When only $V_{bias3}$ drifts, the processing is slightly different therefrom, but it is possible to control the bias voltage in accordance with a similar process for the most part, as described in detail in Non-Patent Documents 1 and 2.

The above description assumes that only any one of $V_{bias1}$, $V_{bias2}$, and $V_{bias3}$ drifts. However, $V_{bias1}$, $V_{bias2}$, and $V_{bias3}$ are not always at their optimum values immediately after the bias control process is started. When a plurality of biases drift simultaneously, the deviations of the biases cause interaction, and thus the synchronous detection characteristics become complex.

FIG. 11 shows the relationship between $\Delta V_{bias1}$ and the output of the first synchronous detection circuit 84 that was obtained by a simulation under the condition that the amount $\Delta V_{bias2}$ of the drift of $V_{bias2}$ is $-0.2 V\pi$ and the amount $\Delta V_{bias3}$ of drift of $V_{bias3}$ is $+0.2 V\pi$. Compared with FIG. 10, the zero cross points on the upward slopes deviate significantly (see the arrows in FIG. 11). For this reason, the feedback loop causes $V_{bias1}$ to converge to an inappropriate value.

As can be understood from this example, if a plurality of biases excessively deviate from their optimum values immediately before the start-up of the bias control circuit, it is difficult to control all the biases to appropriate values unless an appropriate start-up sequence is used. In the worst case, the biases fall into false stable points and the ABC is locked in a state in which the biases are not optimum.

Patent Document 1 proposes a start-up sequence with which a correct bias control can be performed even if a plurality of biases simultaneously deviate from their optimum values. This technique exploits the symmetry of the change amount of the synchronous detection characteristics that is generated when $V_{bias3}$ is changed by a half-wave voltage $V\pi$.

In order to describe the start-up sequence of Patent Document 1, the reason the deviations of the zero cross points in the synchronous detection results are generated as can be seen in FIG. 10 and FIG. 11 will be briefly described first. For simplification of the description, it is assumed first that the optical IQ modulator has an ideal structure, there is no imbalance between the MZIs, and the interactions among the biases are negligible. Moreover, it is assumed that the change amounts of $\theta_1$ to $\theta_3$ are proportional to $V_{bias1}$ to $V_{bias3}$, respectively.

FIG. 12A to FIG. 12C are diagrams showing examples of the constellation of an $n^2$-ary optical QAM signal. Here, n=2, and the amplitudes of the differential drive signals (Dataj–Dataj) are set to be lower than half the half-wave voltage $V\pi$ at the RF ports (j=1, 2). If the bias voltages are appropriate values, the shape of the constellation of the optical QAM signal becomes one as shown in FIG. 12B. The optical power P of the optical QAM signal is proportional to the sum of squares of the magnitudes of the vectors of the optical electric fields of symbols A to D. As shown in FIG. 7, if the data bias voltages $V_{biasj}$ are optimum, that is, $\Delta V_{biasj}=0$, $|E_{j1}|=|E_{j2}|$ is satisfied and all the absolute values of the optical electric fields of the $E_j$ components of the symbols are equal to each other (j=1, 2).

It is assumed that only the data bias voltage $V_{bias1}$ drifts by $\Delta V_{bias1}=+0.5 V\pi$ or $-0.5 V\pi$ from the state shown in FIG. 12B and the other biases are maintained at appropriate values. FIG. 12A shows the constellation when an amount of the drift $\Delta V_{bias1}$ is $-0.5 V\pi$, and FIG. 12C shows the constellation when the amount of the drift $\Delta V_{bias1}$ is +0.5 $V\pi$. Because $\Delta V_{bias3}=0$, $\theta_3=\pi/2$ is satisfied, but the contour of the constellation is no longer a square, and the optical power P varies depending on $\Delta V_{bias1}$. Because there are relationships that $|E_{11}^-|=|E_{12}^-|$ and $|E_{11}^+|=|E_{12}^+|$ as shown in FIG. 7, the shape of the constellation with the drift $\Delta V_{bias1}=-0.5$ $V\pi$ (FIG. 12A) is a mirror-image of the one with the inverted signed drift, $\Delta V_{bias1}=+0.5$ $V\pi$ (FIG. 12C). The symmetry axis of these mirror images is $E_2$ axis. For this reason, the optical power P is dependent only on the absolute value of $\Delta V_{bias1}$ and is independent of the sign of $\Delta V_{bias1}$.

FIG. 13 shows a change in the optical power P with respect to $\Delta V_{bias1}$ under the condition $\Delta V_{bias2}=\Delta V_{bias3}=0$. Symbols 12A, 12B, and 12C shown in the graph of FIG. 13 respectively correspond to the constellations of FIG. 12A, FIG. 12B, and FIG. 12C. It can be seen from FIG. 13 that the optical power P has the minimum value at $\Delta V_{bias1}=0$. The first synchronous detection circuit 84 shown in FIG. 9 detects a fluctuation of the optical power P as a result of the dithering of the optical electric field of the $E_1$ component, and the output of the first synchronous detection circuit 84 becomes zero at $\Delta V_{bias1}=0$ because the optical power P has the minimum value at $\Delta V_{bias1}=0$. This agrees with the simulation result shown in FIG. 10.

FIG. 14A to FIG. 14C are diagrams showing examples of the constellation of an $n^2$-ary optical QAM signal when the bias voltages $V_{bias2}$ and $V_{bias3}$ are different from their optimum values. When the bias voltages $V_{bias2}$ and $V_{bias3}$ are different from their optimum values, $\theta_3$ is not a right angle, and thus the constellation is distorted as shown, for example, in FIG. 14B. In this case, a mirror-image relationship is not present between the shape of the constellation when the drift of $V_{bias1}$ is $\Delta V_{bias1}=+0.5$ $V\pi$ (FIG. 14C) and the shape of the constellation when the drift of $V_{bias1}$ is $\Delta V_{bias1}=-0.5$ $V\pi$ (FIG. 14A), unlike the aforementioned examples. For this reason, the optical power P at $\Delta V_{bias1}=0$ does not have the minimum value.

FIG. 15 shows a change in the optical power P with respect to $\Delta V_{bias1}$ under the condition that $\Delta V_{bias2}=-0.2$ $V\pi$ and $\Delta V_{bias3}=0.2$ $Va$. Symbols 14A, 14B, and 14C shown in the graph of FIG. 15 respectively correspond to the constellations of FIG. 14A, FIG. 14B, and FIG. 14C. In FIG. 15, the minimum value of the optical power P deviates from $\Delta V_{bias1}=0$. The arrow shown in FIG. 15 represents an amount of the deviation d1 from $\Delta V_{bias1}=0$. Because of this deviation, the output of the first synchronous detection circuit 84 also becomes zero at a point that deviates from $\Delta V_{bias1}=0$. This deviation is a cause of the deviation that appears in the simulation result shown in FIG. 11.

Next, let us consider conversion of $\theta_3$ into $\theta_3+\pi$ with respect to the constellations shown in FIG. 14A to FIG. 14C. This can be achieved by artificially changing the orthogonal bias voltage $V_{bias3}$ by $V\pi$ to thereby obtain $\Delta V_{bias3}=-0.8$ $V\pi$. Because it is assumed here that the interactions among the biases are negligible, $\Delta V_{bias1}$ and $\Delta V_{bias2}$ are unchanged even if $V_{bias3}$ is changed.

As a result, the constellations as shown in FIG. 16A to FIG. 16C are obtained. Compared with FIG. 14A to FIG. 14C, the positional relationships between the constellations and an origin are exchanged between FIG. 16A and FIG. 16C and FIG. 14A and FIG. 14C. That is, by rotating FIG. 16C by 180 degrees, the shape of the constellation and the positional relationship between the constellation and the origin become the same as those of FIG. 14A except that the arrangement of the symbols and the sign of the E1 axis are changed. Moreover, by rotating FIG. 16A by 180 degrees, the shape of the constellation and the positional relationship between the constellation and the origin become the same as those of FIG. 14C except that the arrangement of the symbols and the sign of the E1 axis are changed. As described above, the optical power P of an optical QAM signal is determined by the sum of squares of the magnitudes of the vectors of the optical electric fields of the symbols A to D. For this reason, the optical power P in FIG. 14A is the same as that in FIG. 16C irrespective of the exchange of the arrangement of the symbols and the sign of the E1 axis. Moreover, the optical power P in FIG. 14C is the same as that in FIG. 16A. FIG. 17 shows a change in the optical power P with respect to $\Delta V_{bias1}$ under the condition that $\Delta V_{bias2}=-0.2$ $V\pi$ and $\Delta V_{bias3}=-0.8$ $V\pi$. Symbols 16A, 16B, and 16C shown in the graph of FIG. 17 respectively correspond to the constellations of FIG. 16A, FIG. 16B, and FIG. 16C. The sign of deviation d2 is opposite to that of FIG. 15, where d2 is the deviation between $\Delta V_{bias1}$ at which the optical power P becomes the minimum value and $\Delta V_{bias1}=0$ (see the arrow in FIG. 17).

As described above, it is assumed that the optical IQ modulator M has an ideal structure, there is no imbalance between the MZIs, and the interactions among the biases are negligible; under this assumption, there is a relationship of d1=−d2. Using this antisymmetry, in Patent Document 1, $V_{bias1}$ at which the output of the first synchronous detection circuit 84 becomes zero is searched for while artificially changing $V_{bias3}$ by $V\pi$ and the optimum value of $V_{bias1}$ (i.e., $V_{bias1}$ at which $\Delta V_{bias1}=0$) is obtained by averaging the results of these searches. It is possible to optimize $V_{bias2}$ using similar means. Once $V_{biasj}$ (j=1, 2) are optimized, $V_{bias3}$ can be easily optimized using the technique of Non-Patent Document 1 or 2.

PRIOR ART DOCUMENTS

Patent Document

Patent Document 1: Japanese Patent No. 5671130.

Non-Patent Documents

Non-Patent Document 1: Hiroto Kawakami, Eiji Yoshida, and Yutaka Miyamoto, "Auto Bias Control Technique Based on Asymmetric Bias Dithering for Optical QPSK Modulation", Journal of Lightwave Technology, Vol. 30, No. 7, April 2012, pp. 962-968

Non-Patent Document 2: Hiroto Kawakami, Takayuki Kobayashi, Eiji Yoshida, and Yutaka Miyamoto, "Auto bias control technique for optical 16-QAM transmitter with asymmetric bias dithering", Optics Express B308, Vol. 19, No. 26, December 2011

Non-Patent Document 3: Hiroto Kawakami, Shoichiro Kuwahara, and Akira Hirano, "Drive-amplitude-independent Auto Bias Control Circuit for QAM Signals and Its Demonstration with an InP-based IQ Modulator", 42nd European Conference and Exhibition on Optical Communications, W4 P1 SC 4, September 2016, pp. 815-817

SUMMARY OF INVENTION

Problems to be Solved by the Invention

However, because variations in optical IQ modulators have increased recently, examples that are hard to be handled by the aforementioned technique described in Patent Document 1 have appeared. As an example, in semiconductor-type optical IQ modulators, the magnitudes of the non-linear optical effects generated at the two arms of each of the first optical phase modulation unit 2 and the second optical phase modulation unit 3 tend to be imbalanced, and the antisymmetry of the phase shift amounts $+\varphi_j$ and $-\varphi_j$ (j=1, 2) shown in FIG. 6 may be broken. Moreover, as another example, in order to adjust the phase shift amounts $\pm\theta_j$ (j=1, 2) and $+\theta_3$ in FIG. 6, optical IQ modulators that exploit the thermal expansion of optical waveguides using heaters have recently been developed, in place of the Pockels effect, which has conventionally been widely used. In such optical IQ modulators, because a plurality of heaters are arranged in a relatively narrow region, thermal cross-talk is not negligible, and thus there is a possibility that a phenomenon occurs in which $\Delta V_{biasj}$ (j=2, 3) shift from zero in the process of adjusting $\Delta V_{bias1}$ to zero. In such an example, it is difficult to achieve a quick convergence with the technique described in Patent Document 1 and a state in which the bias values are unstable continues for a while after completion of a start-up sequence.

In view of the above circumstances, an object of the present invention is to provide a bias control circuit and a bias control method capable of converging the bias values of optical transmitters for a multi-level QAM earlier.

Means for Solving the Problems

An aspect of the present invention is a bias control circuit that performs bias control of an optical modulator, wherein the optical modulator includes: a first optical phase modulation unit that changes the phase or intensity of input light in accordance with a first n-ary data signal, which takes n kinds of values; a second optical phase modulation unit that changes the phase or intensity of input light in accordance with a second n-ary data signal, which takes n kinds of values; an optical phase shifter that delays at least one of output light from the first optical phase modulation unit and output light from the second optical phase modulation unit to apply an optical phase difference of $+\pi/2$ or $-\pi/2$; and a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal, the bias control circuit includes: a first bias power supply that generates a first bias voltage for performing a setting so that the output light from the first optical phase modulation unit is extinguished when the first n-ary data signal is a zero level; a second bias power supply that generates a second bias voltage for performing a setting so that the output light from the second optical phase modulation unit is extinguished when the second n-ary data signal is a zero level; a third bias power supply that generates a third bias voltage for adjusting a phase shift amount of the optical phase shifter; an optical power monitor that monitors optical power of output light from the optical modulator; and a control unit that controls the first bias voltage generated by the first bias power supply, the second bias voltage generated by the second bias power supply, and the third bias voltage generated by the third bias power supply on the basis of a monitoring result by the optical power monitor, and the control unit performs a loop process that fixes the second bias voltage and iterates a process of recording a pair of a first candidate bias voltage and a second candidate bias voltage that are the first bias voltage when the optical power is controlled so that the optical power converges to a value in the vicinity of the maximum value or the minimum value before and after the third bias voltage is increased or decreased by a half-wave voltage while changing the second bias voltage within a predetermined range, and performs a voltage determination process that calculates the difference between the first candidate bias voltage and the second candidate bias voltage for each of a plurality of recorded pairs and determines a value between the first candidate bias voltage and the second candidate bias voltage of a pair selected on the basis of the calculated difference as the first bias voltage to be generated by the first bias power supply.

Moreover, an aspect of the present invention is a bias control circuit that performs bias control of an optical modulator, wherein the optical modulator includes: a first optical phase modulation unit that changes the phase or intensity of input light in accordance with a first n-ary data signal, which takes n kinds of values; a second optical phase modulation unit that changes the phase or intensity of input light in accordance with a second n-ary data signal, which takes n kinds of values; an optical phase shifter that delays at least one of output light from the first optical phase modulation unit and output light from the second optical phase modulation unit to apply an optical phase difference of $+\pi/2$ or $-\pi/2$; and a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal, the bias control circuit includes: a first bias power supply that generates a first bias voltage for performing a setting so that output light from the first optical phase modulation unit is extinguished when the first n-ary data signal is a zero level; a second bias power supply that generates a second bias voltage for performing a setting so that output light from the second optical phase modulation unit is extinguished when the second n-ary data signal is a zero level; a third bias power supply that generates a third bias voltage for adjusting a phase shift amount of the optical phase shifter; an optical power monitor that monitors optical power of output light from the optical modulator; and a control unit that controls the first bias voltage generated by the first bias power supply, the second bias voltage generated by the second bias power supply, and the third bias voltage generated by the third bias power supply on the basis of a monitoring result by the optical power monitor, and the control unit performs a loop process that fixes the second bias voltage and iterates a process of applying dithering of a predetermined frequency to the amplitude of the first n-ary data signal or the first bias voltage and recording a pair of a first candidate bias voltage and a second candidate bias voltage that are the first bias voltage when control is performed so that a component of a frequency that is an integral multiple of the predetermined frequency superposed on the optical power converges to a value in the vicinity of zero, the maximum, or the minimum before and after the third bias voltage is increased or decreased by a half-wave voltage while changing the second bias voltage within a predetermined range, and performs a voltage determination process that calculates the difference between the first candidate bias voltage and the second candidate bias voltage for each of a plurality of recorded pairs and determines a value between the first candidate bias voltage and the second candidate bias voltage of a pair selected on the basis of the calculated difference as the first bias voltage to be generated by the first bias power supply.

In the aforementioned bias control circuits, the control unit may determine that the second bias voltage when the selected pair has been obtained is to be generated by the second bias power supply.

In the aforementioned bias control circuits, the control unit may perform the loop process and the voltage determination process after exchanging a procedure for the first bias voltage and a procedure for the second bias voltage, and may determine the second bias voltage to be generated by the second bias power supply.

In the aforementioned bias control circuits, the control unit may control the third bias voltage using the determined first bias voltage and the determined second bias voltage and may end a start-up process of the bias control circuit.

In the aforementioned bias control circuits, the Pockels effect or heat expansion of optical waveguides may be utilized when the first bias voltage, the second bias voltage, and the third bias voltage adjust optical phases.

An aspect of the present invention is a bias control method for an optical modulator that is executed by a bias control circuit, wherein the optical modulator includes: a first optical phase modulation unit that changes the phase or intensity of input light in accordance with a first n-ary data signal, which takes n kinds of values; a second optical phase modulation unit that changes the phase or intensity of input light in accordance with a second n-ary data signal, which takes n kinds of values; an optical phase shifter that delays at least one of output light from the first optical phase modulation unit and output light from the second optical phase modulation unit to apply an optical phase difference of $+\pi/2$ or $-\pi/2$; and a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal, and the bias control method includes: a bias voltage generation step in which in the bias control circuit, a first bias power supply generates a first bias voltage for performing a setting so that the output light from the first optical phase modulation unit is extinguished when the first n-ary data signal is a zero level, a second bias power supply generates a second bias voltage for performing a setting so that the output light from the second optical phase modulation unit is extinguished when the second n-ary data signal is a zero level, and a third bias power supply generates a third bias voltage for adjusting a phase shift amount of the optical phase shifter; a bias voltage control step in which in the bias control circuit, a control unit controls the first bias voltage generated by the first bias power supply, the second bias voltage generated by the second bias power supply, and the third bias voltage generated by the third bias power supply on the basis of a monitoring result of optical power of output light from the optical modulator; a loop processing step in which in the bias control circuit, the control unit fixes the second bias voltage and iterates a process of recording a pair of a first candidate bias voltage and a second candidate bias voltage that are the first bias voltage when the optical power is controlled so that the optical power converges to a value in the vicinity of the maximum value or the minimum value before and after the third bias voltage is increased or decreased by a half-wave voltage while changing the second bias voltage within a predetermined range; and a voltage determination step in which in the bias control circuit, the control unit calculates the difference between the first candidate bias voltage and the second candidate bias voltage for each of a plurality of pairs recorded in the loop processing step and determines a value between the first candidate bias voltage and the second candidate bias voltage of a pair selected on the basis of the calculated difference as the first bias voltage to be generated by the first bias power supply.

An aspect of the present invention is a bias control method for an optical modulator that is executed by a bias control circuit, wherein the optical modulator includes: a first optical phase modulation unit that changes the phase or intensity of input light in accordance with a first n-ary data signal, which takes n kinds of values; a second optical phase modulation unit that changes the phase or intensity of input light in accordance with a second n-ary data signal, which takes n kinds of values; an optical phase shifter that delays at least one of output light from the first optical phase modulation unit and output light from the second optical phase modulation unit to apply an optical phase difference of $+\pi/2$ or $-\pi/2$; and a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal, and the bias control method includes: a bias voltage generation step in which in the bias control circuit, a first bias power supply generates a first bias voltage for performing a setting so that output light from the first optical phase modulation unit is extinguished when the first n-ary data signal is a zero level, a second bias power supply generates a second bias voltage for performing a setting so that output light from the second optical phase modulation unit is extinguished when the second n-ary data signal is a zero level, and a third bias power supply generates a third bias voltage for adjusting a phase shift amount of the optical phase shifter; a bias voltage control step in which in the bias control circuit, a control unit controls the first bias voltage generated by the first bias power supply, the second bias voltage generated by the second bias power supply, and the third bias voltage generated by the third bias power supply on the basis of a monitoring result of optical power of output light from the optical modulator; a loop processing step in which in the bias control circuit, the control unit fixes the second bias voltage and iterates a process of applying dithering of a predetermined frequency to the amplitude of the first n-ary data signal or the first bias voltage and recording a pair of a first candidate bias voltage and a second candidate bias voltage that are the first bias voltage when control is performed so that a component of a frequency that is an integral multiple of the predetermined frequency superposed on the optical power converges to a value in the vicinity of zero, the maximum, or the minimum before and after the third bias voltage is increased or decreased by a half-wave voltage while changing the second bias voltage within a predetermined range; and a voltage determination step in which in the bias control circuit, the control unit calculates the difference between the first candidate bias voltage and the second candidate bias voltage for each of a plurality of pairs recorded in the loop processing step and determines a value between the first candidate bias voltage and the second candidate bias voltage of a pair selected on the basis of the calculated difference as the first bias voltage to be generated by the first bias power supply.

Advantageous Effects of the Invention

According to the present invention, it is possible to converge the bias values of optical transmitters for a multi-level QAM earlier.

MODES FOR CARRYING OUT THE INVENTION

Hereinafter, embodiments of the present invention will be described with reference to the drawings. The embodiments of the present invention relate to automatic control of bias voltages in optical transmitters for a multi-level QAM. In particular, the embodiments of the present invention relate to controllers that manage a start-up sequence for more reliably controlling biases to be the optimum values at the time of start of the automatic control.

Figure 15:
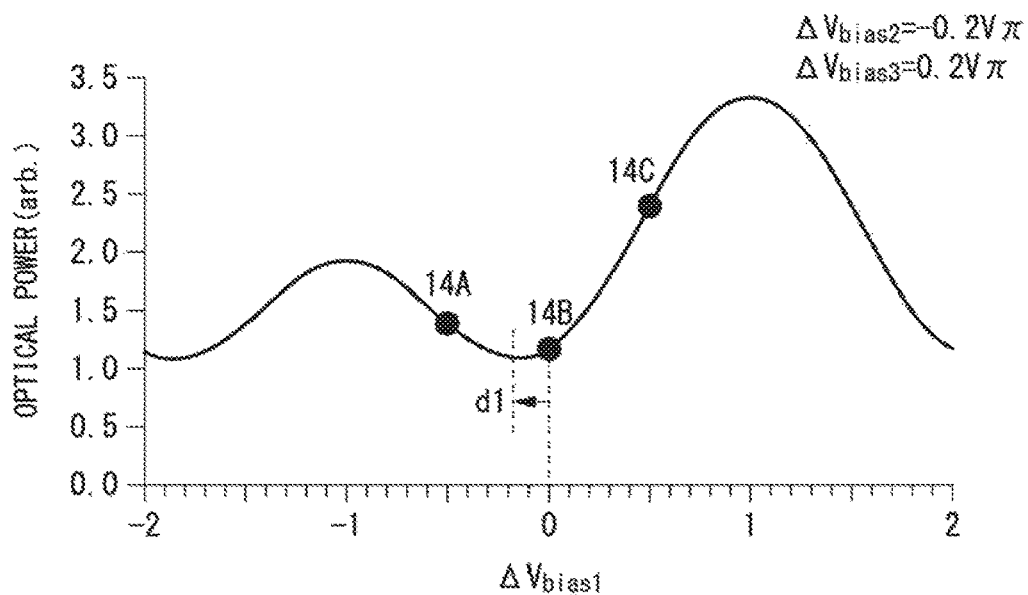
FIG. 15 is a diagram showing a change in optical power in accordance with the conventional art.
Figure 16A:
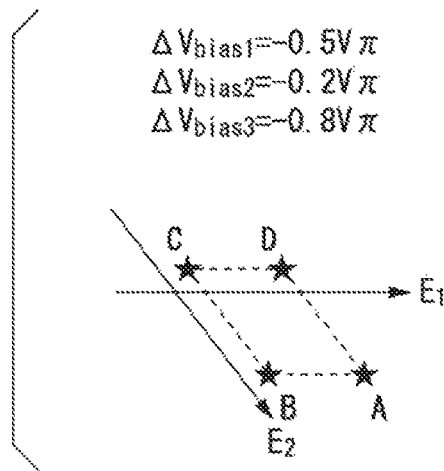
FIG. 16A is a diagram showing an example of the constellation of the $n^2$-ary optical QAM signal in accordance with the conventional art.
Figure 16B:
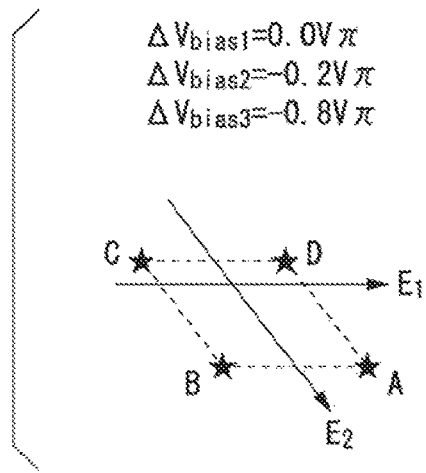
FIG. 16B is a diagram showing an example of the constellation of the $n^2$-ary optical QAM signal in accordance with the conventional art.
Figure 16C:
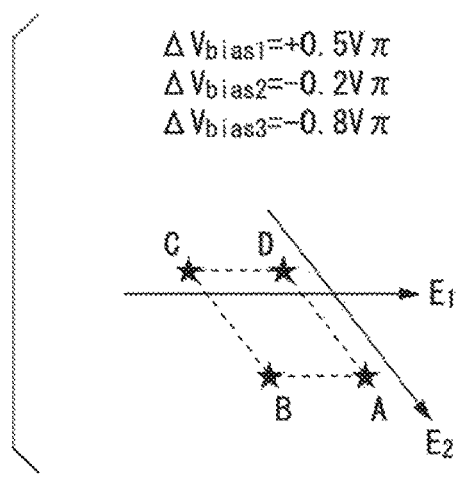
FIG. 16C is a diagram showing an example of the constellation of the $n^2$-ary optical QAM signal in accordance with the conventional art.
Figure 17:
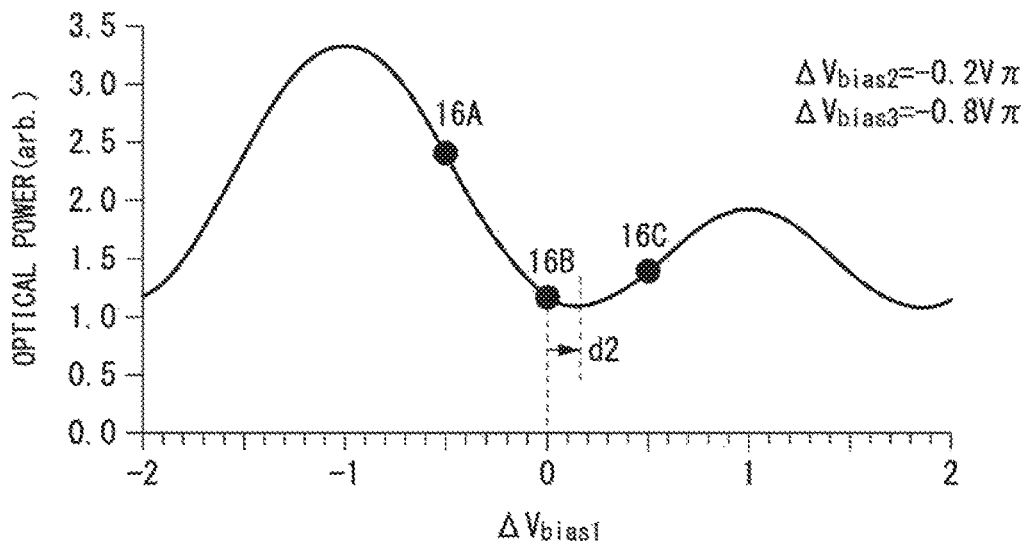
FIG. 17 is a diagram showing a change in optical power in accordance with the conventional art.

Prior to describing the embodiments of the present invention, let us consider the case in which the condition that "$V_{biasj}$=1, 2) with which the optical power P becomes the maximum value or the minimum value are almost unchanged for any $\theta_3$ even if an operation of converting $\theta_3$ into $\theta_3+\pi$ is performed" is satisfied. In other words, this condition means that "for any orthogonal bias voltage $V_{bias3}$, the sign and absolute value of d1 shown in FIG. 15 and d2 shown in FIG. 17 are almost identical, in spite of the artificially changing $V_{bias3}$ by $V\pi$".

Figure 7:
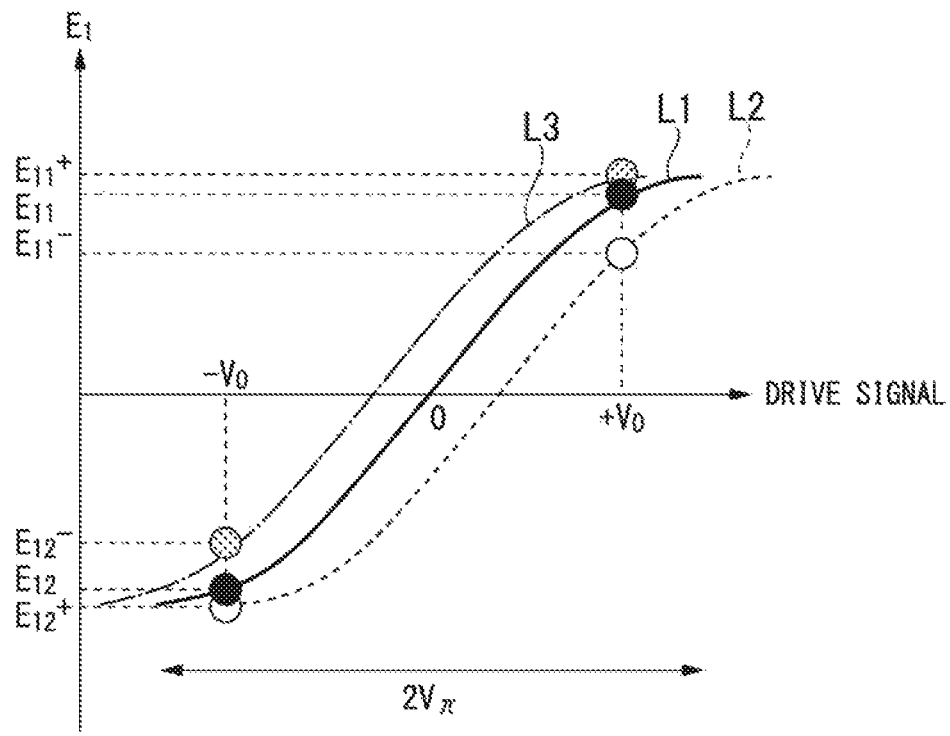
FIG. 7 is a diagram showing the relationship among the electric field of output light of a first optical phase modulation unit of the optical transmitter in accordance with the conventional art, the voltage of a data signal, and a data bias voltage.
Figure 8:
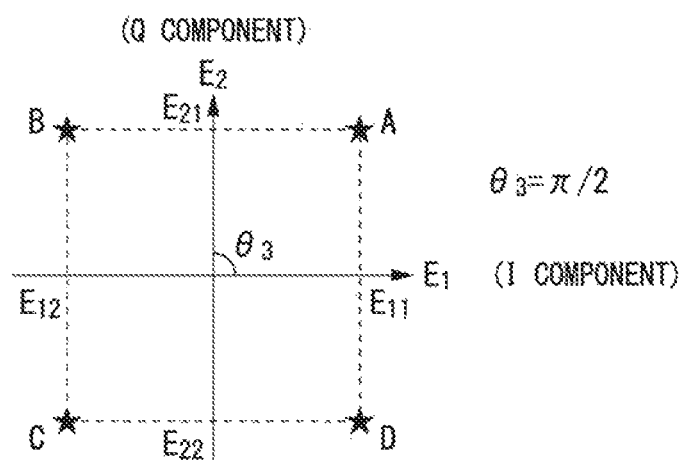
FIG. 8 is a diagram showing the constellation of output light of an optical IQ modulator in accordance with the conventional art.
Figure 18A:
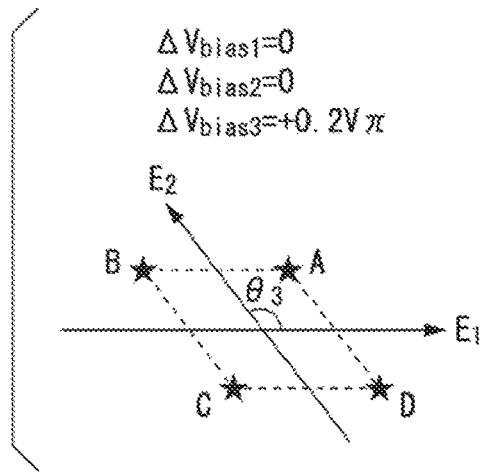
FIG. 18A is a diagram showing a constellation of the $n^2$-ary optical QAM signal before $\theta_3$ is increased or decreased by $\pi$.
Figure 18B:
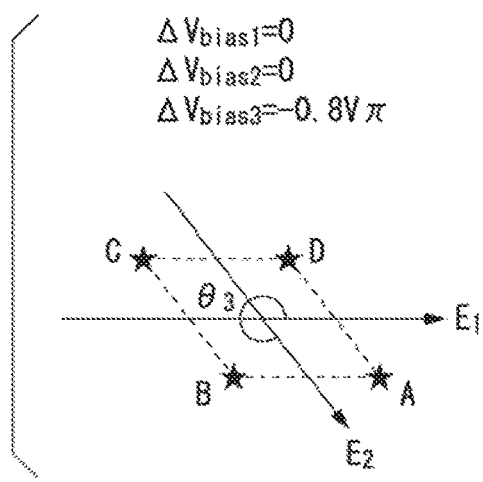
FIG. 18B is a diagram showing a constellation of the $n^2$-ary optical QAM signal after $\theta_3$ is increased or decreased by $\pi$.

Under the assumptions that the optical IQ modulator has an ideal structure which has no imbalance between the MZIs and has negligible interactions among the biases, it is required that d1=d2=0 in order to meet the aforementioned condition. In this case, $\Delta V_{biasj}$=0 is satisfied before and after the conversion of $\theta_3$, and $E_{11}$, $E_{12}$, $E_{21}$, and $E_{22}$ shown in FIG. 7 and FIG. 8 satisfy $E_{j1}$=−$E_{j2}$ (j=1, 2). FIG. 18A and FIG. 18B are diagrams showing the constellations of an $n^2$-ary optical QAM signal before and after $\theta_3$ is increased or decreased by $\pi$ when d1 is equal to d2. Here, n=2. FIG. 18A shows the constellation before $\theta_3$ is increased by it, and FIG. 18B shows the constellation after $\theta_3$ is increased by $\pi$. As shown in FIG. 18A and FIG. 18B, even if $\theta_3$ is increased or decreased by $\pi$, the shapes of the constellations are the same except that the arrangements of the symbols are exchanged, and thus the shape of the constellation and the positional relationship between the constellation and an origin are unchanged.

Figure 19:
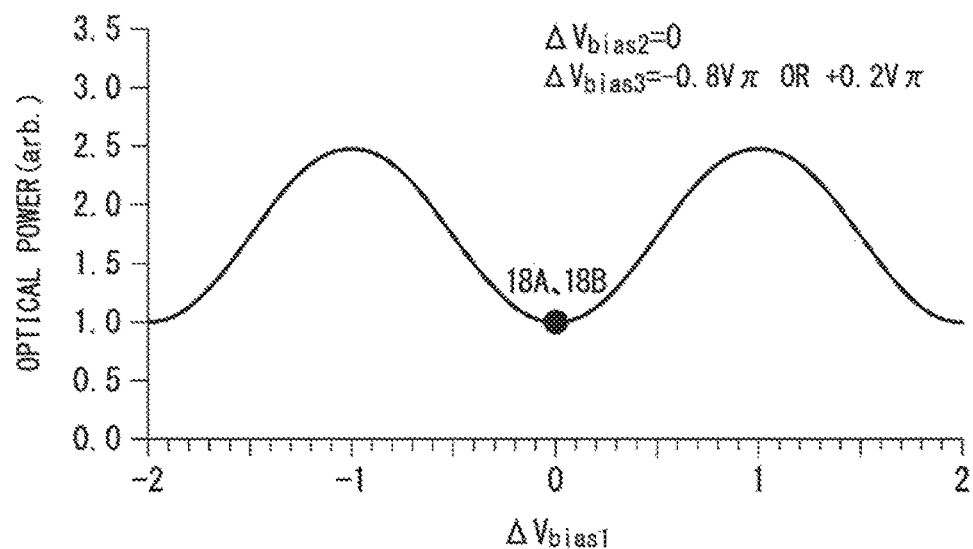
FIG. 19 is a diagram showing a change in optical power with respect to $V_{bias1}$ before and after $\theta_3$ is increased or decreased by $\pi$.

FIG. 19 is a diagram showing a change in the optical power P before and after $\theta_3$ is increased or decreased by $\pi$. FIG. 19 shows a change in the optical power P with respect to $V_{bias1}$ under the condition that $\Delta V_{bias2}$=0.0 and $\Delta V_{bias3}$=−0.8 V$\pi$ or +0.2 V$\pi$. The conditions such as a drive amplitude are the same as those of FIG. 13 to FIG. 17. The optical power P is the same irrespective of whether $\Delta V_{bias3}$ is −0.8

Vπ or +0.2 Vπ, and the value of the optical power P becomes the minimum value at $\Delta V_{bias1}=0$.

The following can be derived therefrom. That is, "if the optical power P is maintained at the maximum value or the minimum value before and after an operation of artificially changing $V_{bias3}$ by Vπ is performed for any orthogonal bias voltage $V_{bias3}$, then $V_{biasj}$ (j=1, 2) are the optimum values ($\Delta V_{biasj}=0$)".

The above description assumes that the optical IQ modulator has an ideal structure which has no imbalance between the MZIs and has negligible interactions among the biases. In non-ideal optical IQ modulators, for which this assumption does not hold, $\Delta V_{biasj}$ may fluctuate in the process of artificially changing $V_{bias3}$ by Vπ. Moreover, in imbalanced optical IQ modulators, the shape of the constellation does not become a diamond as shown in FIG. 18A and FIG. 18B and the side AD may not be parallel to the side BC. In such a case, even if one of d1 shown in FIG. 15 and d2 shown in FIG. 17 is zero, the other one may be a value that is slightly different from zero.

For this reason, the aforementioned conclusion is modified as follows. That is, "if the values of $V_{biasj}$ (j=1, 2) at which the optical power P becomes the maximum value or the minimum value are almost unaffected by the operation of artificially changing $V_{bias3}$ by Vπ for any orthogonal bias voltage $V_{bias3}$, then $V_{biasj}$ (j=1, 2) are approximately equal to the optimum values ($\Delta V_{biasj}=0$)".

The embodiments of the present invention exploit this property to coarsely adjust $V_{bias1}$ and $V_{bias2}$ and lead them to values in the vicinity of the optimum values. Although it may be difficult to perform this coarse adjustment while the operation of optical communication services is being performed because of an intense fluctuation of $V_{bias3}$, it is possible to avoid a situation in which the ABC circuit falls into a false optimum point by applying the embodiments to the start-up sequence of the ABC circuit. Even if bias drift occurs while the in-service ABC is being executed after completion of the start-up sequence, the biases have the values in the vicinity of the optimum values, and thus it is possible to perform the ABC using one of the methods described in Non-Patent Documents 1 to 3.

Unlike the technique described in Patent Document 1, the embodiments of the present invention first search for a region in which the absolute values of d1 and d2 (see FIG. 15 and FIG. 17) are small and then determine $V_{bias1}$ and $V_{bias2}$, and thus it is possible to achieve the ABC with higher accuracy than that by the technique described in Patent Document 1 even if the structure of the optical IQ modulator is not ideal.

Although the above description describes an example of an optical QPSK signal having a small amplitude, almost the same discussion is established for general QAM signals. A slight modification may be required depending on the drive amplitude and the signal format, and a description thereof will be given in the second embodiment.

A. First Embodiment

In the first embodiment of the present invention, $V_{bias1}$ and $V_{bias2}$ are controlled so that the value of the optical power P of the output from the optical IQ modulator becomes the maximum value or the minimum value. Whether the optical power P becomes the maximum value or the minimum value when the bias values are optimum depends on the drive amplitude and the signal format, and thus it is necessary to check it in advance using, for example, the discrimination equation D described in Non-Patent Document 2.

In order to make the value of the optical power P of the output from the optical IQ modulator maximum or minimum, the hill climbing method, for example, can be used; however, more realistically, this is achieved by dithering $V_{bias1}$ or $V_{bias2}$, performing synchronous detection, selecting the slope of the synchronous detection result, and making the synchronous detection result zero, as described in the Background Art.

Figure 1:
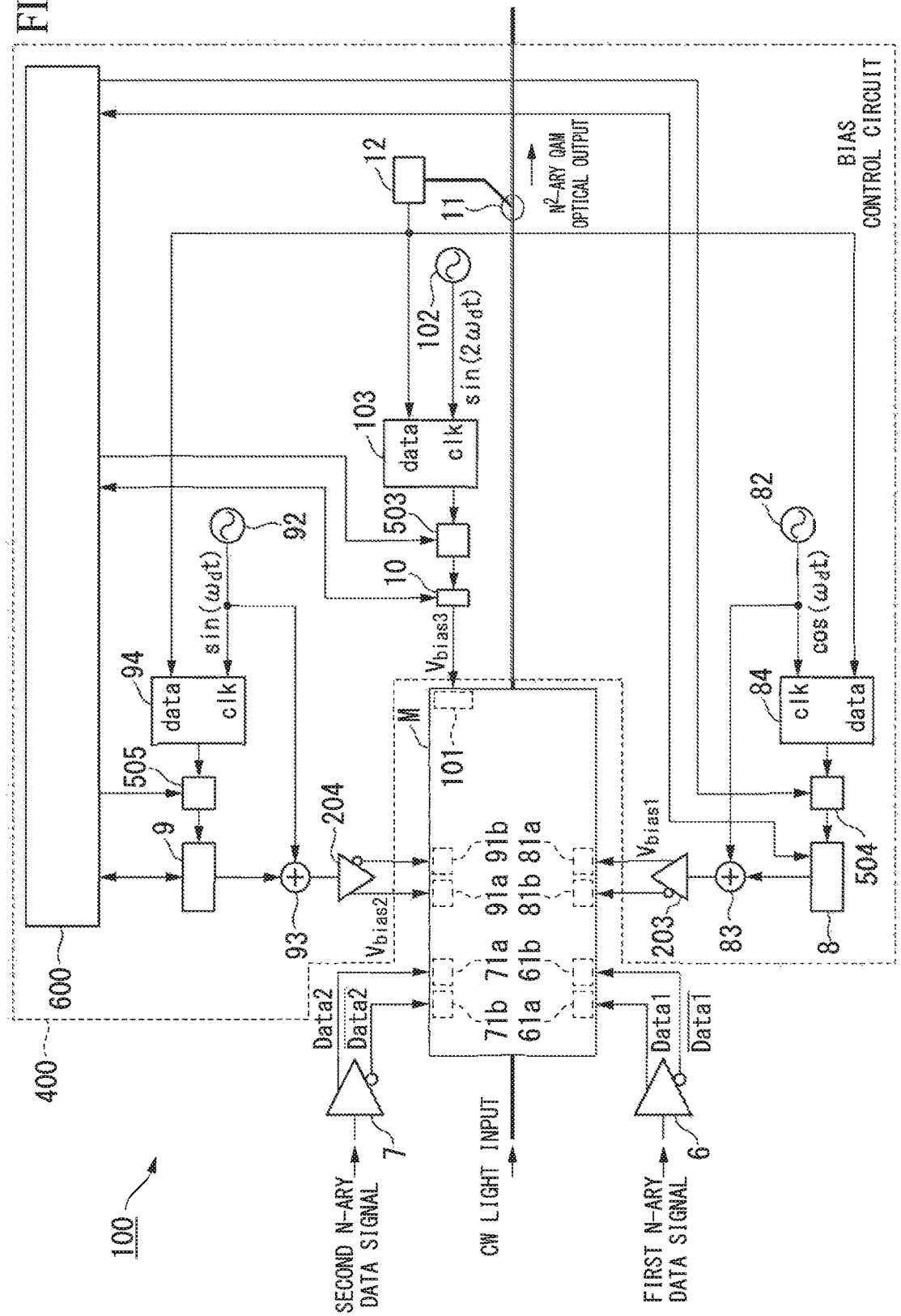
FIG. 1 is a block diagram showing the structure of an optical transmitter provided with a bias control circuit in accordance with a first embodiment of the present invention.
Figure 9:
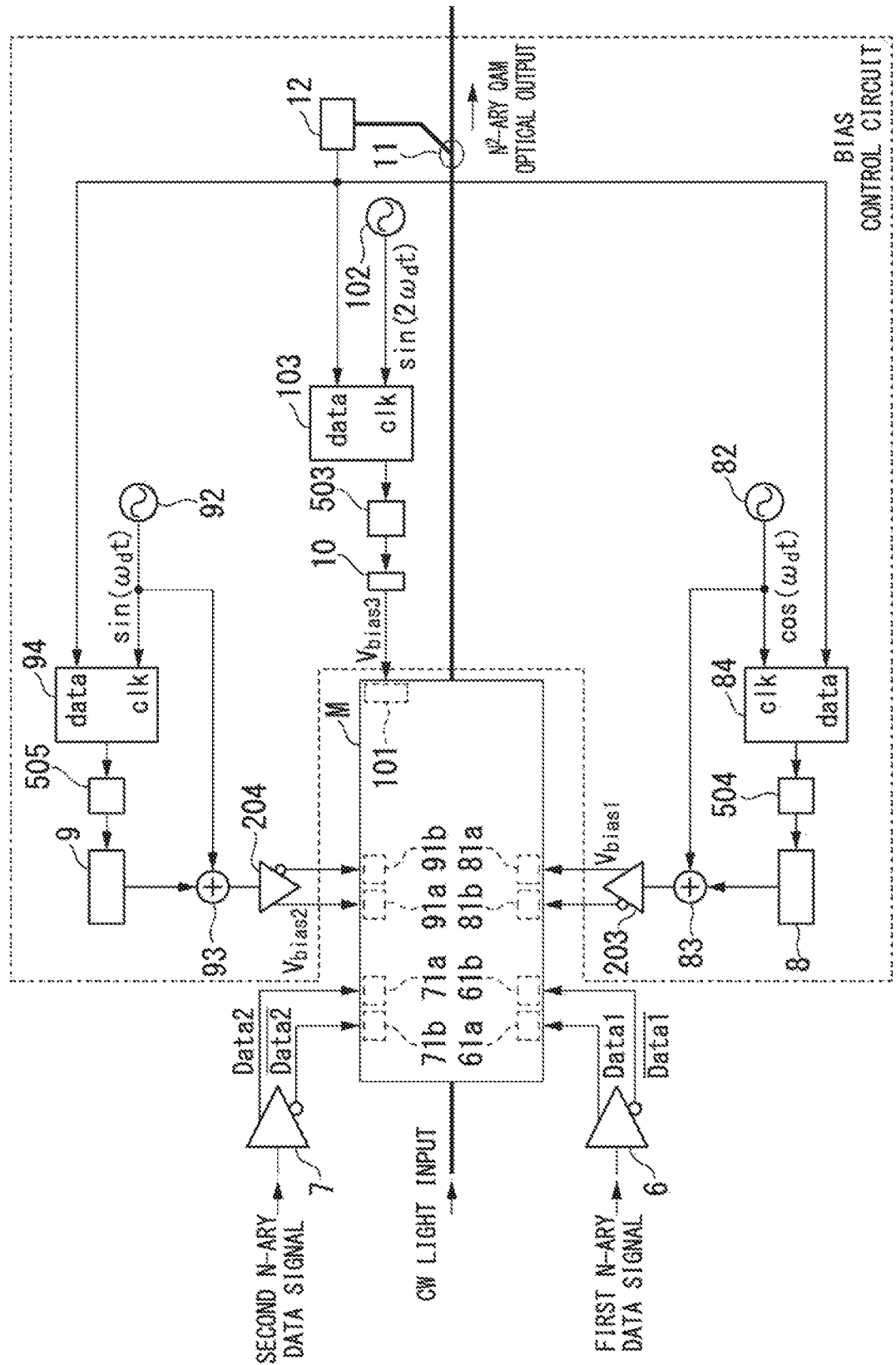
FIG. 9 is a block diagram showing the structure of an optical transmitter provided with a bias control circuit in accordance with the conventional art.
Figure 10:
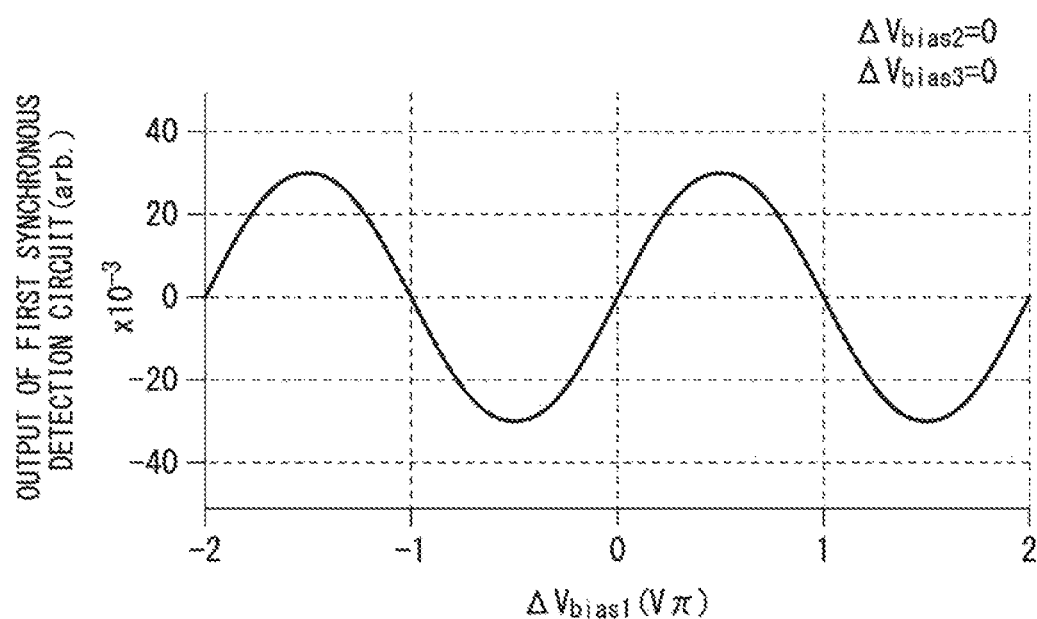
FIG. 10 is a diagram showing an example of the output of a first synchronous detection circuit in accordance with the conventional art.
Figure 11:
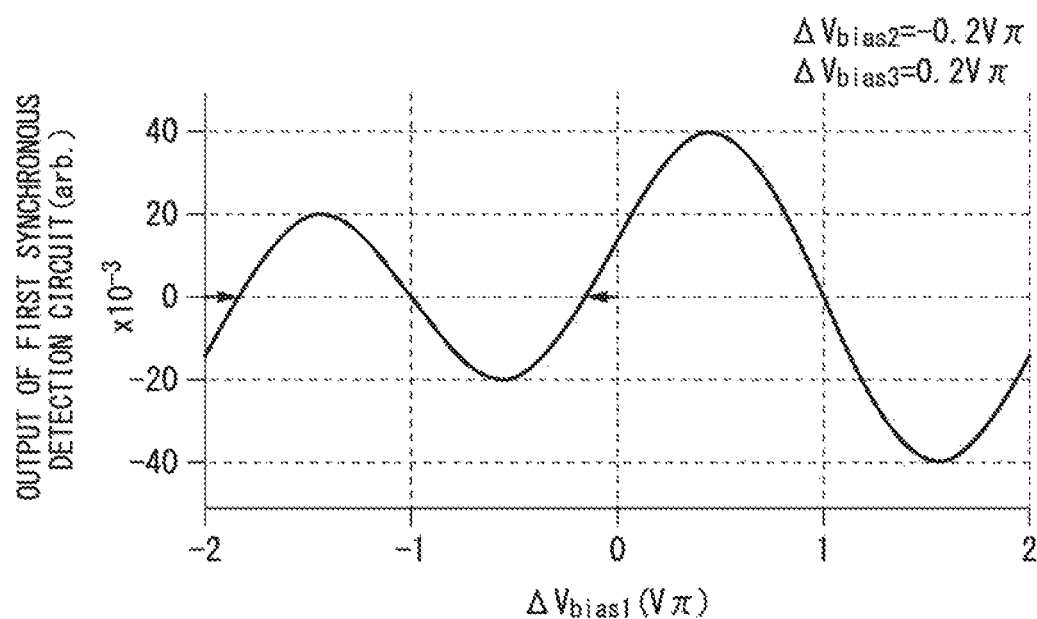
FIG. 11 is a diagram showing an example of the output of the first synchronous detection circuit in accordance with the conventional art.
Figure 12A:
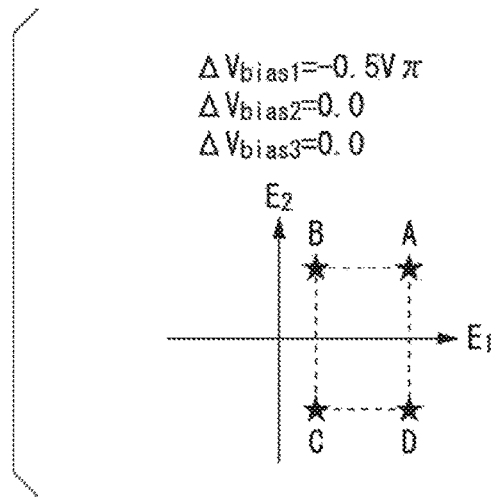
FIG. 12A a diagram showing an example of the constellation of an $n^2$-ary optical QAM signal in accordance with the conventional art.
Figure 12B:
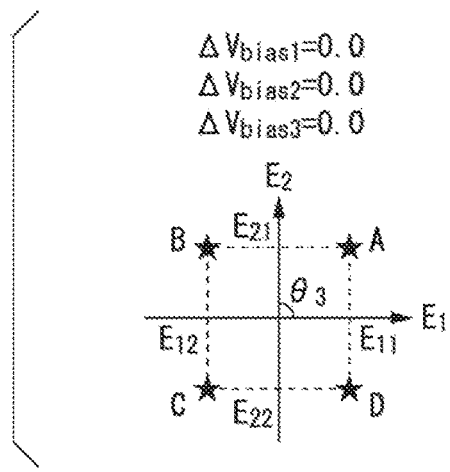
FIG. 12B a diagram showing an example of the constellation of the $n^2$-ary optical QAM signal in accordance with the conventional art.
Figure 12C:
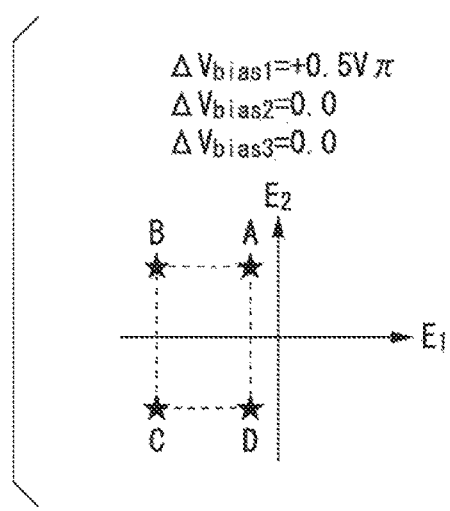
FIG. 12C a diagram showing an example of the constellation of the $n^2$-ary optical QAM signal in accordance with the conventional art.
Figure 13:
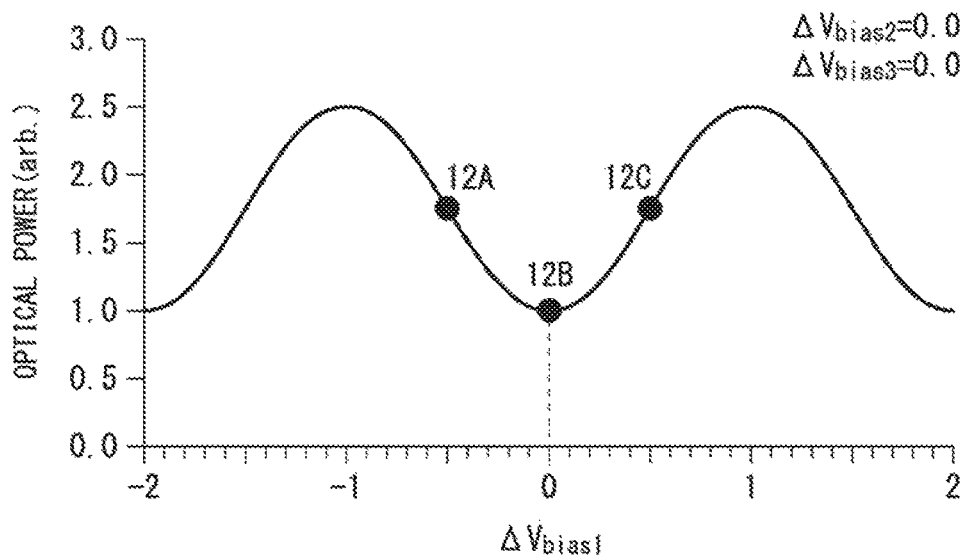
FIG. 13 is a diagram showing a change in optical power in accordance with the conventional art.
Figure 14A:
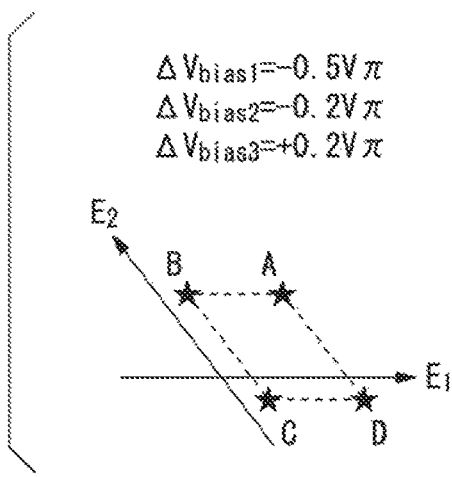
FIG. 14A is a diagram showing an example of the constellation of the $n^2$-ary optical QAM signal in accordance with the conventional art.
Figure 14B:
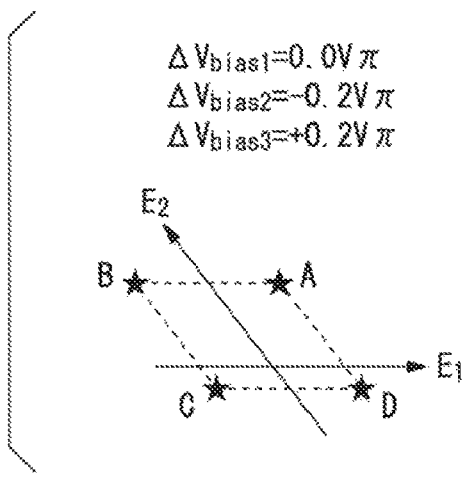
FIG. 14B is a diagram showing an example of the constellation of the $n^2$-ary optical QAM signal in accordance with the conventional art.
Figure 14C:
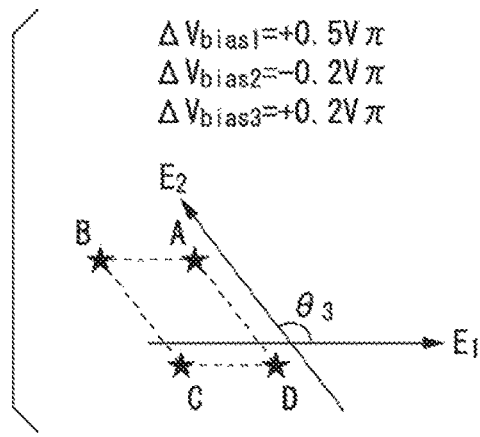
FIG. 14C is a diagram showing an example of the constellation of the $n^2$-ary optical QAM signal in accordance with the conventional art.

FIG. 1 is a block diagram showing the structure of an optical transmitter 100 in accordance with the first embodiment of the present invention. In FIG. 1, the same reference symbols are assigned to components that are the same as those in the QAM transmitter in accordance with the conventional art shown in FIG. 9. The optical transmitter 100 is an n-ary QAM transmitter. The optical transmitter 100 includes an optical IQ modulator M, a first drive amplifier 6, a second drive amplifier 7, and a bias control circuit 400. The bias control circuit 400 includes an optical splitter 11, an optical power monitor 12, a first oscillator 82, a first synchronous detection circuit 84, a first loop gain adjustment circuit 504, a first bias power supply 8, a first adder 83, a first differential output DC amplifier 203, a second oscillator 92, a second synchronous detection circuit 94, a second loop gain adjustment circuit 505, a second bias power supply 9, a second adder 93, a second differential output DC amplifier 204, a third oscillator 102, a third synchronous detection circuit 103, a third loop gain adjustment circuit 503, a third bias power supply 10, and a controller 600. The optical transmitter 100 shown in FIG. 1 differs from the QAM transmitter shown in FIG. 9 in that the bias control circuit 400, which is an ABC circuit, is provided with the controller 600.

The first drive amplifier 6 amplifies a first n-ary data signal to generate two kinds of signals Data1 and ⁻Data1 having a normal phase and a reverse phase, respectively. The second drive amplifier 7 amplifies a second n-ary data signal to generate two kinds of signals Data2 and ⁻Data2 having a normal phase and a reverse phase, respectively.

Figure 6:
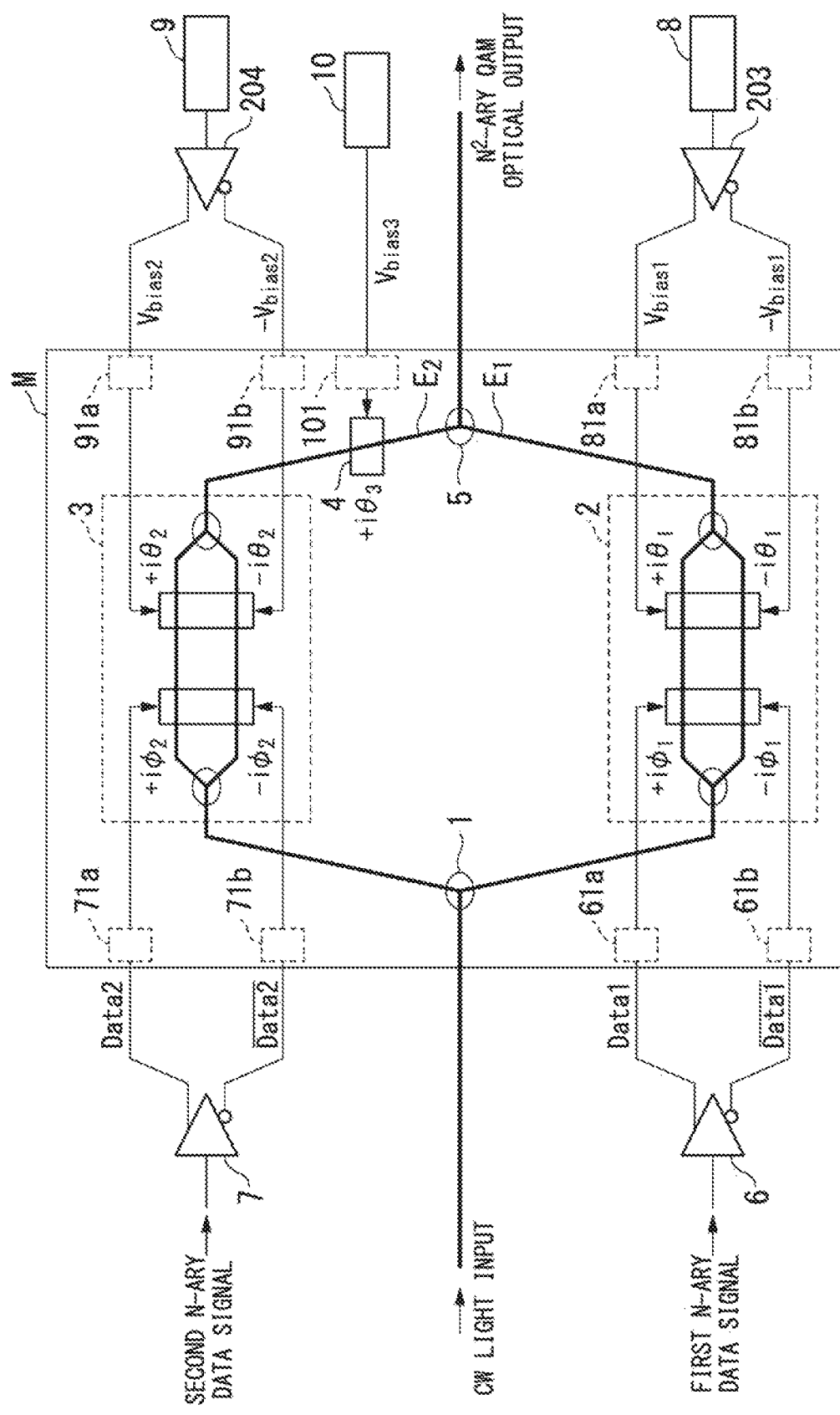
FIG. 6 is a diagram showing an example of the structure of an optical transmitter in accordance with a conventional art.

The optical IQ modulator M has the same structure as that of FIG. 6 and generates an $n^2$-ary QAM signal. The first optical coupler 1 (FIG. 6) divides CW light (continuous wave light) into two and inputs the resultant signals to the first optical phase modulation unit 2 (FIG. 6) and the second optical phase modulation unit 3 (FIG. 6). The first optical phase modulation unit 2 (FIG. 6) branches the CW light input from the first optical coupler 1 (FIG. 6), outputs the resultant signals to two waveguides, and applies Data1 and ⁻Data1 generated by the first drive amplifier 6 to optical signals of the waveguides via first drive signal electrodes 61a and 61b. First data bias electrodes 81a and 81b add optical phase shifts $+\theta_1$ and $-\theta_1$ by means of DC voltages (first bias voltages) $V_{bias1}$ and $-V_{bias1}$ from the first differential output DC amplifier 203. The first optical phase modulation unit 2 (FIG. 6) combines the optical signals of the two waveguides for which the optical phase difference has been adjusted and then outputs an optical signal obtained by the combining.

The second optical phase modulation unit 3 (FIG. 6) branches the CW light input from the first optical coupler 1 (FIG. 6), outputs the resultant signals to two waveguides, and applies Data2 and ⁻Data2 generated by the second drive amplifier 7 to optical signals of the waveguides via second drive signal electrodes 71a and 71b. Second data bias electrodes 91a and 91b add optical phase shifts $+\theta_2$ and $-\theta_2$ by means of DC voltages (second bias voltages) $V_{bias2}$ and $-V_{bias2}$ from the second differential output DC amplifier 204. The second optical phase modulation unit 3 (FIG. 6) combines the optical signals of the two waveguides for which the optical phase difference has been adjusted and then outputs an optical signal obtained by the combining.

A phase difference $\theta_3$ is added to at least one of an output of the first optical phase modulation unit 2 and an output of the second optical phase modulation unit 3 by the optical phase shifter 4 (FIG. 6) having an orthogonal bias electrode 101, to which an orthogonal bias voltage is applied, the output of the first optical phase modulation unit 2 and the output of the second optical phase modulation unit 3 are combined by the second optical coupler 5 (FIG. 6), and a signal obtained by the combining is output as an $n^2$-ary QAM optical signal.

In the bias control circuit 400, the optical splitter 11 branches output light from the optical IQ modulator M and outputs the resultant signal to the optical power monitor 12. The optical power monitor 12 monitors optical power of the output light branched by the optical splitter 11.

The first synchronous detection circuit 84 performs synchronous detection on the basis of a reference clock output from the first oscillator 82 and a monitoring result by the optical power monitor 12. The first synchronous detection circuit 84 feeds the synchronous detection result back to the first bias power supply 8 via the first loop gain adjustment circuit 504, as an error signal. The first adder 83 superposes a dithering signal $\cos(\omega_d \times t)$ output from the first oscillator 82 on an output voltage of the first bias power supply 8. The first differential output DC amplifier 203 supplies DC voltages $V_{bias1}$ and $-V_{bias1}$ generated from an output voltage of the first adder 83 to the first data bias electrodes 81a and 81b.

The second synchronous detection circuit 94 performs synchronous detection on the basis of a reference clock output from the second oscillator 92 and the monitoring result by the optical power monitor 12. The second synchronous detection circuit 94 feeds the synchronous detection result back to the second bias power supply 9 via the second loop gain adjustment circuit 505, as an error signal. The second adder 93 superposes a dithering signal $\sin(\omega_d \times t)$ output from the second oscillator 92 on an output voltage of the second bias power supply 9. The second differential output DC amplifier 204 supplies DC voltages $V_{bias2}$ and $-V_{bias2}$ generated from an output voltage of the second adder 93 to the second data bias electrodes 91a and 91b.

The third synchronous detection circuit 103 performs synchronous detection on the basis of a reference clock output from the third oscillator 102 and the monitoring result by the optical power monitor 12. The third synchronous detection circuit 103 feeds the synchronous detection result back to the third bias power supply 10 via the third loop gain adjustment circuit 503, as an error signal. The third bias power supply 10 supplies the orthogonal bias voltage $V_{bias3}$ to the orthogonal bias electrode 101. The controller 600 refers to the aforementioned three kinds of error signals obtained from the monitoring result by the optical power monitor 12, controls the first bias power supply 8, the second bias power supply 9, and the third bias power supply 10, changes $V_{bias1}$, $V_{bias2}$, and $V_{bias3}$ respectively output from the first bias power supply 8, the second bias power supply 9, and the third bias power supply 10, and records their changes.

The structure of the bias control circuit 400 in accordance with the present embodiment includes three kinds of control loops, and the controller 600 operates the three kinds of control loops in a time-sharing manner in a start-up sequence immediately after the start-up of the transmitter. The order thereof is such that control of the data bias $V_{bias1}$ or the data bias $V_{bias2}$ is performed first, and then control of $V_{bias3}$ is performed. Although the control of $V_{bias1}$ may be performed first or the control of $V_{bias2}$ may be performed first, it is assumed here that $V_{bias1}$ is controlled first.

Figure 2:
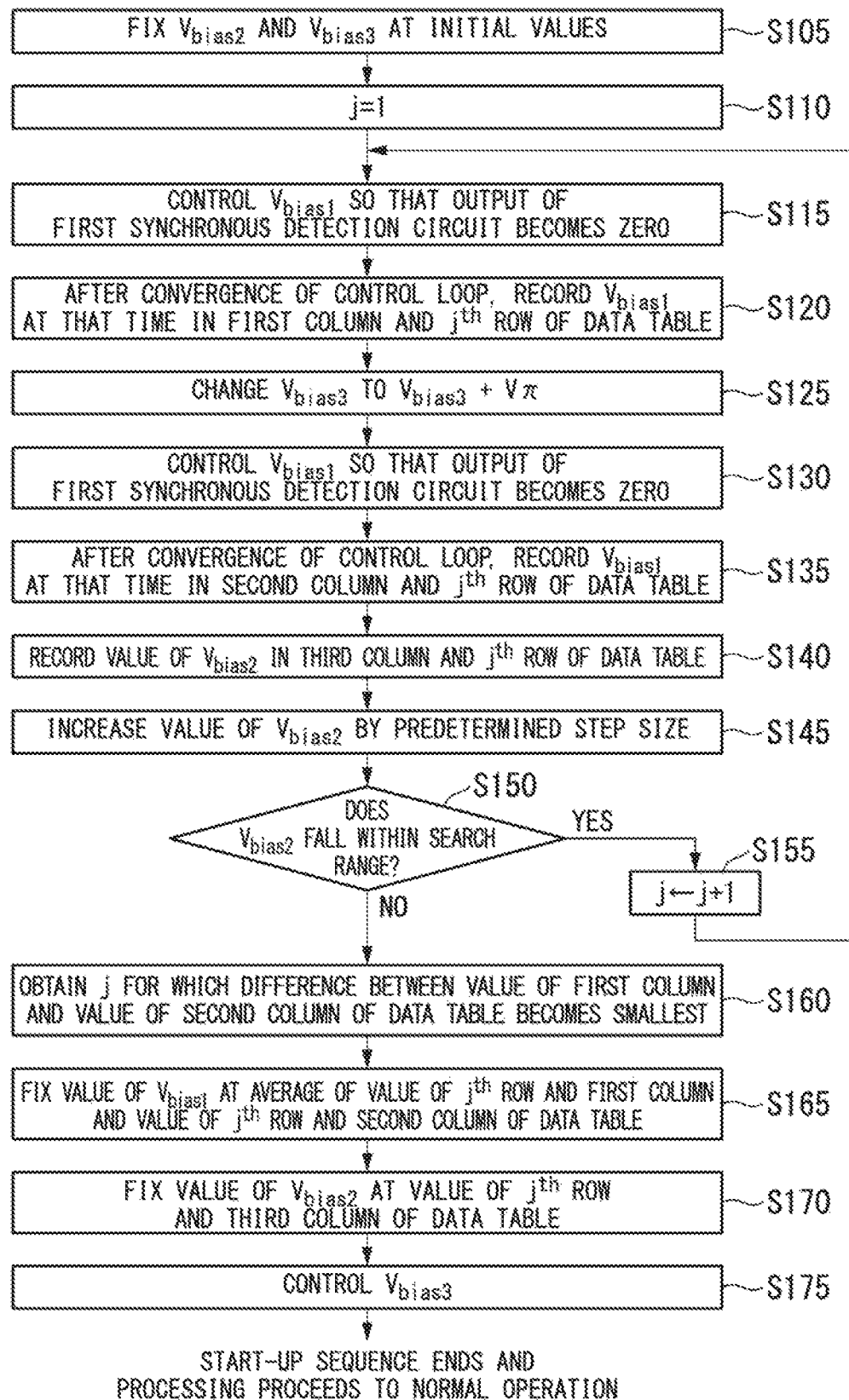
FIG. 2 is a diagram showing a flow of the processing of the bias control circuit in accordance with the first embodiment.

FIG. 2 is a diagram showing a flow of the processing of the bias control circuit 400. The processing of the steps of the start-up sequence will be described using the flow shown in FIG. 2.

In step S105, the controller 600 fixes the values of $V_{bias2}$ and $V_{bias3}$ at initial values. This is achieved by sending a command from the controller 600 to the second loop gain adjustment circuit 505 and the third loop gain adjustment circuit 503 to set their loop gains to zero ($-\infty$ dB). Next, in step S110, the controller 600 assigns an initial value of "1" to a variable j. The variable j represents a row number of a data table.

Next, in step S115, the controller 600 controls $V_{bias1}$ so that the output of the first synchronous detection circuit 84 approaches zero. More specifically, the controller 600 controls $V_{bias1}$ so that when dithering of a frequency f is applied to the amplitude of $V_{bias1}$, a component of a frequency that is an integral multiple of the frequency f superposed on the output of the optical power monitor 12 is present in the vicinity of zero. This can be achieved by sending a command from the controller 600 to the first loop gain adjustment circuit 504 to set its loop gain to an appropriate value. The magnitude of the optimum loop gain is determined by the power of the CW light input to the optical IQ modulator M and the sensitivity of the optical power monitor 12. The sign of the feedback signal is determined by the sign of the slope of the target zero cross point.

After the control loop has converged, the processing proceeds to step S120 of FIG. 2. In step S120, the controller 600 records the converged value of $V_{bias1}$ in the first column and the $j^{th}$ row of the data table, and the processing proceeds to step S125. In step S125, the controller 600 increases $V_{bias3}$ by $V\pi$. In step S130, the controller 600 operates the control loop only for $V_{bias1}$ so that the output of the first synchronous detection circuit 84 approaches zero, similarly to step S115.

After the control loop has converged, the processing proceeds to step S135 of FIG. 2. In step S135, the controller 600 records the converged value of $V_{bias1}$ in the second column and the $j^{th}$ row of the data table, and the processing proceeds to step S140. In step S140, the controller 600 records the value of $V_{bias2}$ in the third column and $j^{th}$ row of the data table.

In step S145, the controller 600 increase the value of $V_{bias2}$ by a predetermined step size. In step S150, the controller 600 determines whether or not $V_{bias2}$ obtained as a result of increasing its value falls within a predetermined search range. If a determination has been made that $V_{bias2}$ falls within the search range, the controller 600 performs the process of step S155 to add one to the value of j, and the processing returns to step S115.

In step S150, if a determination has been made that $V_{bias2}$ exceeds the predetermined search range, the controller 600 exits the loop, and the processing proceeds to step S160. In step S160, the controller 600 checks the data table and obtains j for which the difference between the value of the first column and the value of the second column is smallest. In step S165, the controller 600 fixes the value of $V_{bias1}$ at the average of the value of the $j^{th}$ row and the first column and the value of the $j^{th}$ row and the second column of the data table. In step S170, the controller 600 fixes the value of $V_{bias2}$ at the value of the $j^{th}$ row and the third column of the data table. At this stage, $V_{bias1}$ and $V_{bias2}$ are present in the vicinity of their optimum values ($\Delta V_{bias1}$=0 and $\Delta V_{bias2}$=0). Thus, in step S175, the controller 600 controls $V_{bias3}$ using a conventional art, such as the method described in one of Non-Patent Documents 1 and 2, to thereby set $V_{bias3}$ to its optimum value ($\Delta V_{bias3}$=0). Here, the bias control circuit 400 ends the start-up sequence of the ABC, the processing proceeds to the normal operation state, and in-service ABC is performed.

It is to be noted that when the aforementioned hill climbing method is used to make the value of the optical power P of the output from the optical IQ modulator maximum or minimum, it is sufficient that $V_{bias1}$ be controlled so that the value of the optical power P of the output from the optical IQ modulator becomes maximum or minimum in step S115 and step S130 of FIG. 2. Moreover, as described above, whether to make $V_{bias1}$ maximum or minimum can be uniquely determined using, for example, the discrimination equation D described in Non-Patent Document 2.

B. Variations of First Embodiment

In the embodiment described above in [A. First Embodiment], $V_{bias3}$ is changed to $V_{bias3}+V\pi$ in step S125. However, because the control range of $V_{bias3}$ is usually limited, it is difficult to continuously increase $V_{bias3}$ (or continuously decrease $V_{bias3}$). For this reason, a method may be employed in which $V_{bias3}$ is increased by $V\pi$ if j is an odd number and $V_{bias3}$ is decrease by $V\pi$ if j is an even number (or vice versa).

Moreover, in [A. First Embodiment], the loop is iterated until $V_{bias2}$ exceeds the search range; however, when the difference between the value of the first column and the value of the second column of the $j^{th}$ row of the data table becomes zero while the loop is being executed, it is no longer necessary to iterate the loop to accumulate data. However, as a matter of fact, the probability that the difference between the value of the first column and the value of the second column of the data table exactly matches zero is very small because of the circuit noise of the first synchronous detection circuit 84, imperfection of the optical IQ modulator M, and the fact that the step size of $V_{bias2}$ is not zero. Thus, the controller 600 may calculate the difference between the first column and second column of the $j^{th}$ row of the data table between step S140 and step S145 of FIG. 2, and if its value becomes smaller than a predetermined threshold, the controller 600 may exit the loop and perform the processing from step S160 using the value of j at that time.

C. Second Embodiment

In [A. First Embodiment] and [B. Variations of First Embodiment], the magnitude of the step size of $V_{bias2}$ determines the magnitude of the error ($\Delta V_{bias2}$) of $V_{bias2}$ at the end of the start-up sequence. While the error becomes small when the step size is small, the time required for the convergence increases. In the second embodiment, in order to solve this problem, when step S105 to step S165 shown in FIG. 2 end, $V_{bias1}$ and $V_{bias2}$ are exchanged, and step S105 to step S165 are iterated again.

Figure 3:
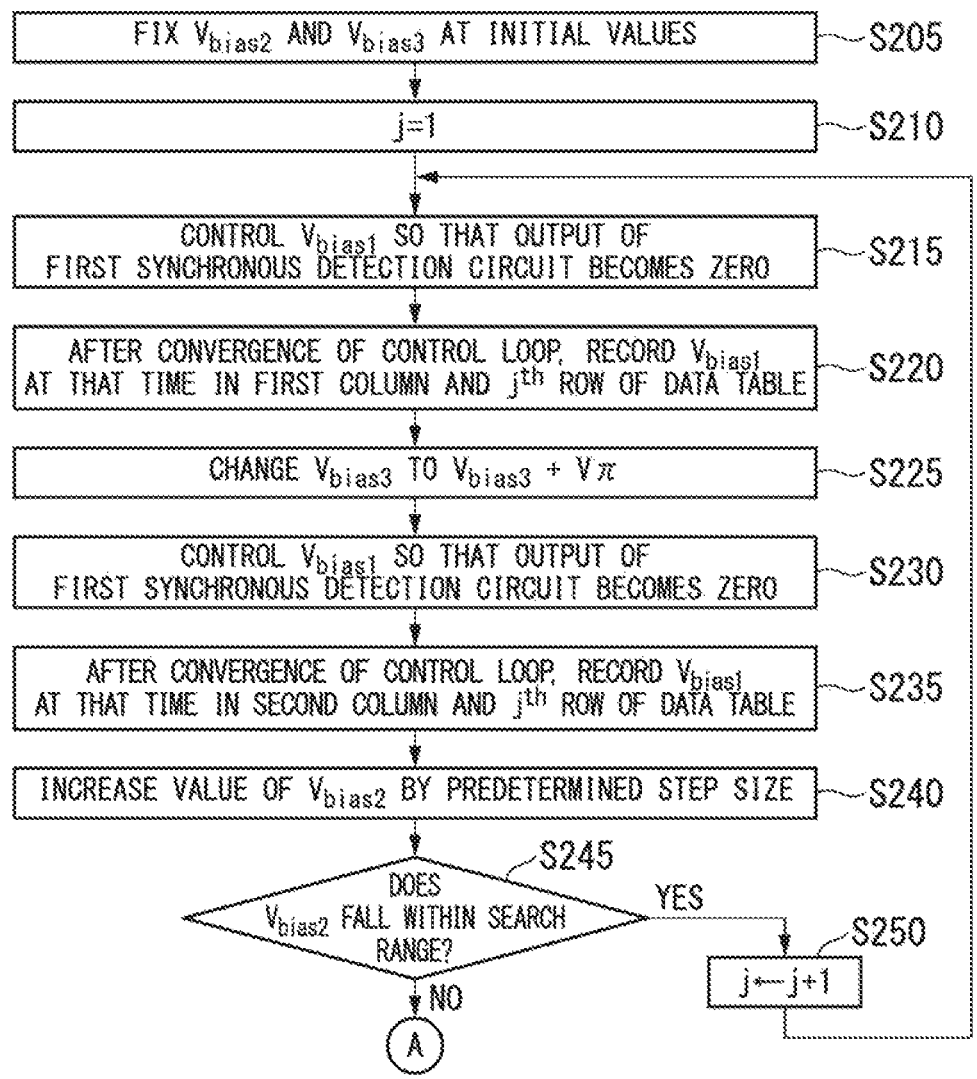
FIG. 3 is a diagram showing a flow of the processing of the bias control circuit in accordance with a second embodiment.
Figure 4:
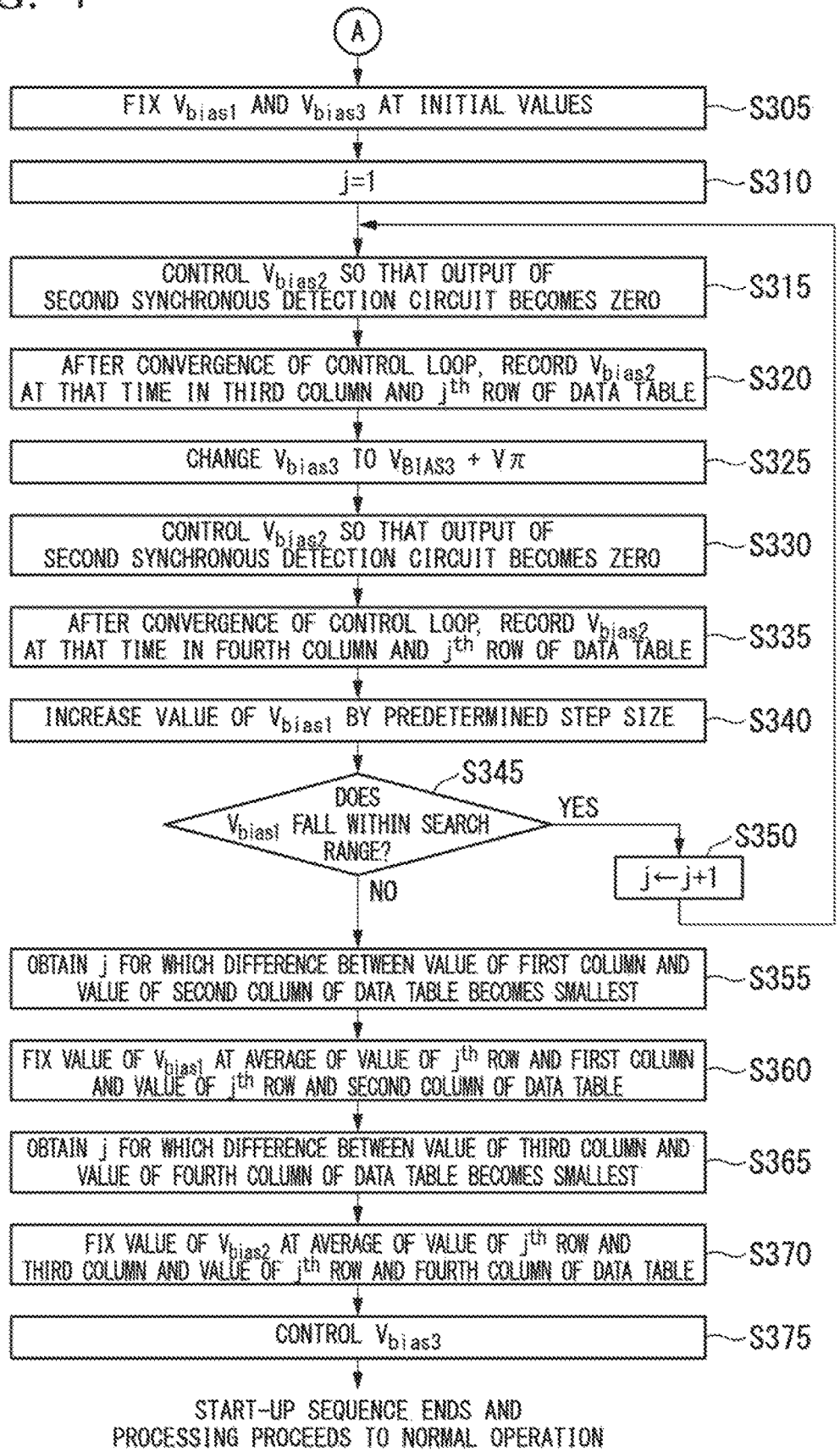
FIG. 4 is a diagram showing a flow of the processing of the bias control circuit in accordance with the second embodiment.

FIG. 3 and FIG. 4 are diagrams showing the flow of the processing of the bias control circuit 400 in accordance with the present embodiment. Although the processing of the bias control circuit 400 in step S205 to step S250 shown in FIG. 3 is almost the same as that in step S105 to step S155 of the first embodiment shown in FIG. 2, the present embodiment does not execute step S140 of FIG. 2 and thus does not record the value of $V_{bias2}$ in the third column of the data table.

In step S305 to step S350 of FIG. 4, the bias control circuit 400 exchanges $V_{bias1}$ and $V_{bias2}$ and performs almost the same processing as that in step S205 to step S250 of FIG. 3. However, in step S320 and step S335, candidate values for $V_{bias2}$ are recorded in the third column and fourth column of the data table.

That is, the controller 600 fixes the values of $V_{bias1}$ and $V_{bias3}$ at initial values in step S305 and assigns an initial value "1" to the variable j in step S310. In step S315, the controller 600 controls $V_{bias2}$ so that the output of the second synchronous detection circuit 94 approaches zero, and after the control loop has converged, in step S320, the controller 600 records the converged value of $V_{bias2}$ in the third column and the $j^{th}$ row of the data table. In step S325, the controller 600 increases $V_{bias3}$ by $V\pi$. In step S330, the controller 600 operates the control loop for only $V_{bias2}$ so that the output of the second synchronous detection circuit 94 approaches zero, and after the control loop has converged, in step S335, the controller 600 records the converged value of $V_{bias2}$ in the fourth column and the $j^{th}$ row of the data table. In step S340, the controller 600 increases the value of $V_{bias1}$ by a predetermined step size and, in step S345, the controller 600 determines whether or not the increased $V_{bias1}$ falls within a predetermined search range. If the controller 600 has determined that the increased $V_{bias1}$ falls within the predetermined search range, the controller 600 performs the process of step S350 to thereby add one to the value of j, and returns the processing to step S315. If the controller 600 has determined that $V_{bias1}$ exceeds the predetermined search range in step S345, the controller 600 exits the loop, and the processing proceeds to step S355.

Step S355 and step S360 shown in FIG. 4 are the same as steps S160 and S165 of the first embodiment shown in FIG. 2. That is, in step S355, the controller 600 checks the data table and obtains j for which the difference between the value of the first column and the value of the second column becomes smallest. In step S360, the controller 600 fixes the value of $V_{bias1}$ at the average of the value of the $j^{th}$ row and the first column and the value of the $j^{th}$ row and the second column of the data table.

In step S365 and step S370 shown in FIG. 4, the controller 600 fixes $V_{bias2}$ using the third column and fourth column of the data table in accordance with the same procedure as that for $V_{bias1}$. That is, in step S365, the controller 600 checks the data table and obtains j for which the difference between the value of the third column and the value of the fourth column becomes smallest. In step S370, the controller 600 fixes the value of $V_{bias2}$ at the average of the value of the $j^{th}$ row and the third column and the value of the $j^{th}$ row and the fourth column of the data table.

At this stage, $V_{bias1}$ and $V_{bias2}$ are present in the vicinity of their optimum values ($\Delta V_{bias1}$=0 and $\Delta V_{bias2}$=0). Thus, in step S375, the controller 600 controls $V_{bias3}$ using a conventional art, such as the method described in one of Non-Patent Documents 1 and 2, and sets $V_{bias3}$ to the optimum value ($\Delta V_{bias3}$=0). Here, the bias control circuit 400 ends the start-up sequence of the ABC, the processing proceeds to the normal operation state, and in-service ABC is performed.

D. Third Embodiment

All the embodiments described above control $V_{bias1}$ and $V_{bias2}$ so that the value of the optical power P of the output from the optical IQ modulator M becomes the maximum value, the minimum value, or a value in the vicinity of the maximum value or the minimum value. However, when the discrimination equation D described in Non-Patent Document 2 is equal to zero or it is very close to zero, the value of the optical power P is almost unchanged or it is unchanged at all regardless of the values of $V_{bias1}$ and $V_{bias2}$. Specifically, this situation occurs when the signal format is QPSK and each of the amplitudes of Dataj and ⁻Dataj shown in FIG. 6 is approximately equal to half the half-wave voltage Vπ at the RF ports of the $j^{th}$ optical phase modulation unit (where j=1, 2). In order to avoid such dependency on the drive amplitude, the technique described in Non-Patent Document 3 can be used.

Figure 5:
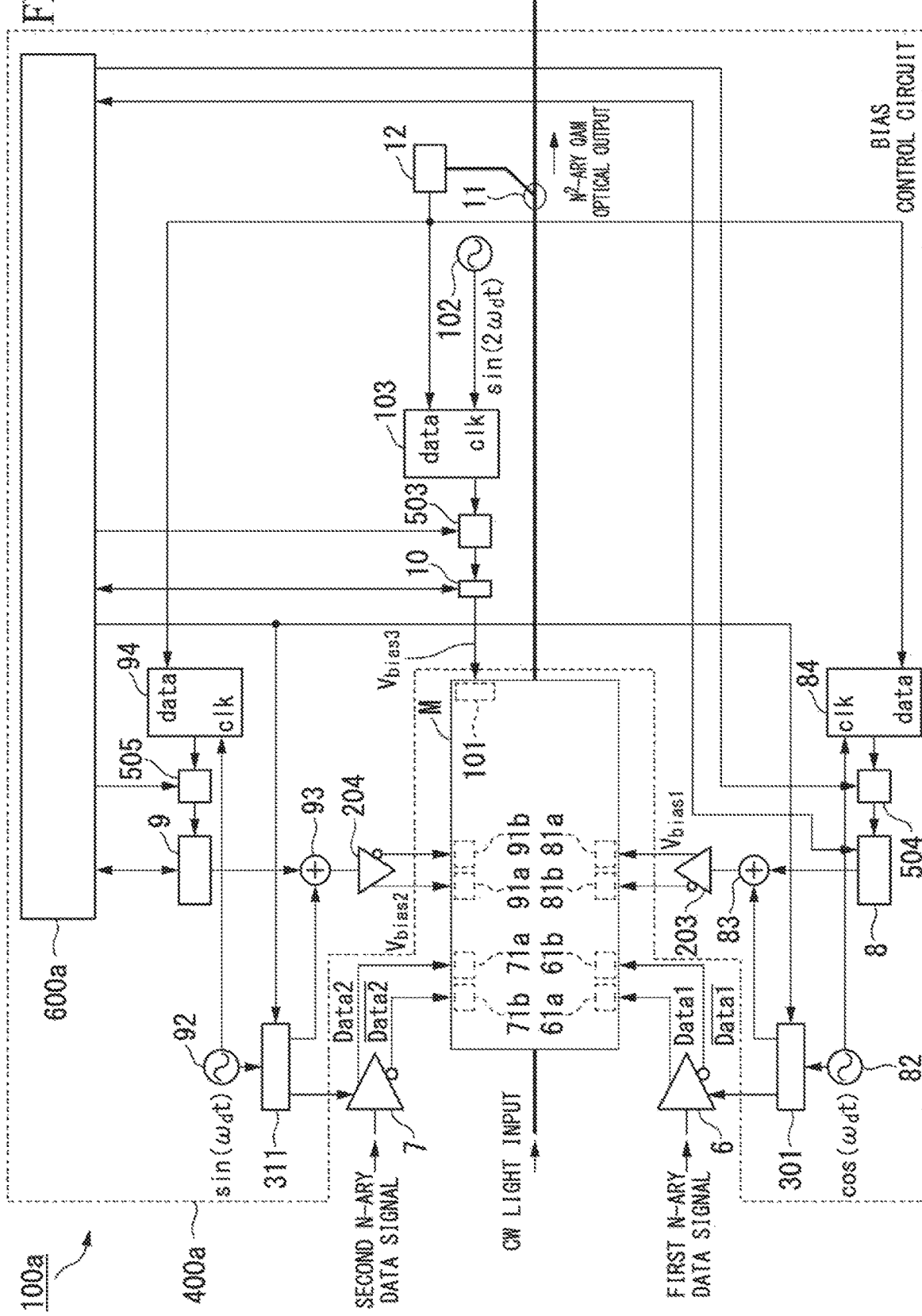
FIG. 5 is a block diagram showing the structure of an optical transmitter provided with a bias control circuit for an $n^2$-ary QAM transmitter in accordance with a third embodiment.

FIG. 5 is a block diagram showing the structure of an optical transmitter 100a in accordance with a variation of the first or second embodiment, in which the technique described in Non-Patent Document 3 is used together. In FIG. 5, the same reference symbols are assigned to components that are the same as those in the optical transmitter 100 shown in FIG. 1, and a description thereof will be omitted. The optical transmitter 100a shown in FIG. 5 differs from the optical transmitter 100 shown in FIG. 1 in that a bias control circuit 400a is provided instead of the bias control circuit 400. The bias control circuit 400a is provided with a controller 600a instead of the controller 600 shown in FIG. 1.

Furthermore, in the structure of the bias control circuit 400a in accordance with the present embodiment, a first switch 301 is provided at a portion of the output of the first oscillator 82. The first switch 301 is periodically switched by the controller 600a. When $V_{bias1}$ is controlled, the output of the first oscillator 82 is sent to a gain adjustment terminal of the first drive amplifier 6, thereby the drive amplitude is dithered. When $V_{bias3}$ is controlled, the output of the first oscillator 82 is sent to the first adder 83, thereby $V_{bias1}$ is dithered.

Moreover, in the structure of the bias control circuit 400a in accordance with the present embodiment, a second switch 311 is provided at a portion of the output of the second oscillator 92. The second switch 311 is periodically switched by the controller 600a. When $V_{bias2}$ is controlled, the output of the second oscillator 92 is sent to a gain adjustment terminal of the second drive amplifier 7 by the second switch 311, thereby the drive amplitude is dithered. When $V_{bias3}$ is controlled, the output of the second oscillator 92 is sent to the second adder 93 by the second switch 311, thereby $V_{bias2}$ is dithered.

Although the control flow of the start-up sequence in the present embodiment is almost the same as that in FIG. 2 (or FIG. 3 to FIG. 4), in step S115 and step S130 of FIG. 2 and step S215 and step S230 of FIG. 3, $V_{bias1}$ is controlled so that the output of the first synchronous detection circuit 84 approaches the maximum or the minimum, rather than zero. More specifically, the controller 600a controls $V_{bias1}$ so that when dithering of a frequency f is applied to the drive amplitude of the first drive amplifier 6, a component of a frequency that is an integral multiple of the frequency f that is superposed on the output from the optical power monitor 12 is present in the vicinity of the maximum or the minimum. Moreover, in step S315 and step S330 of FIG. 4, the controller 600a controls $V_{bias2}$ so that the output of the second synchronous detection circuit 94 approaches the maximum or the minimum, rather than zero. Whether to select the maximum or the minimum is determined by the sign of a proportionality coefficient between a control signal to the gain adjustment terminal and an increase or a decrease in the actual gain. With the present embodiment, $V_{bias1}$ and $V_{bias2}$ can be controlled independently of the drive amplitude.

It is to be noted that as described above, the value which the output of the first synchronous detection circuit 84 or the output of the second synchronous detection circuit 94 should approach through control of $V_{bias1}$ or $V_{bias2}$ is determined by the sign of the proportionality coefficient between the control signal to the gain adjustment terminal and an increase or a decrease in the actual gain. Moreover, the first embodiment describes the structure which dithers $V_{bias1}$ or $V_{bias2}$ and makes the synchronous detection result zero; however, when the target of the synchronous detection is a high-order dithering frequency component, it may be better to make the synchronous detection result the maximum or the minimum, rather than zero. Thus, which of the maximum, the minimum, or zero the synchronous detection result should approach may be experimentally confirmed through the test of the apparatus when the signal format and the structure of the synchronous detection circuit have been determined.

E. Variations of First to Third Embodiments

The embodiments described above assume that the optical phases $\theta_1$, $\theta_2$, and $\theta_3$ (see FIG. 6) are controlled by means of the Pockels effect and these embodiments use the voltages $\pm V_{bias1}$, $\pm V_{bias2}$, and $V_{bias3}$. However, in recent years, there are optical IQ modulators that control the optical phases $\theta_1$, $\theta_2$, and $\theta_3$ using heat by heaters. Even for such modulators, the control flow of the sequence is not substantially changed from the control flows shown in FIG. 2 to FIG. 4. However, because a change in heater power is independent of the sign of the applied voltage, it is not necessary to use the first differential output DC amplifier 203 and the second differential output DC amplifier 204 in this type of optical IQ modulator, and thus these amplifiers are omitted. Control that is similar to those in the other embodiments can be achieved by making a change such as applying $V_{bias1}$ and $V_{bias2}$ to one terminal 81a of the first data bias electrodes and one terminal 91a of the second data bias electrodes and grounding the other terminal 81b of the first data bias electrodes and the other terminal 91b of the second data bias electrodes.

According to the embodiments described above, an optical transmitter (e.g., the optical transmitter 100 or 100a) includes an optical modulator (e.g. the optical IQ modulator M) and a bias control circuit (e.g. the bias control circuit 400 or 400a) that performs bias control of the optical modulator. The optical modulator includes a first optical phase modulation unit (e.g., the first optical phase modulation unit 2), a second optical phase modulation unit (e.g., the second optical phase modulation unit 3), an optical phase shifter (e.g., the optical phase shifter 4), and a combining unit (e.g., the second optical coupler 5). The first optical phase modulation unit changes the phase or intensity of input light in accordance with a first n-ary data signal, which takes n kinds of values, and outputs light of which phase or intensity has been changed. The second optical phase modulation unit changes the phase or intensity of input light in accordance with a second n-ary data signal, which takes n kinds of values, and outputs light of which phase or intensity has been changed. The optical phase shifter delays at least one of output light from the first optical phase modulation unit and output light from the second optical phase modulation unit to generate an optical phase difference of +π/2 or −π/2 between the output lights. The combining unit combines the output light from the first optical phase modulation unit and the output light from the second optical phase modulation unit, wherein the optical phase difference by the optical phase shifter has been applied to at least one of the output lights, and outputs a generated multi-level QAM signal.

The bias control circuit includes a first bias power supply (e.g., the first bias power supply 8), a second bias power supply (e.g., the second bias power supply 9), a third bias power supply (e.g., the third bias power supply 10), an optical power monitor (e.g., the optical power monitor 12), and a control unit (e.g., the controller 600 or 600a). The first bias power supply generates a first bias voltage (e.g., $V_{bias1}$) for performing a setting so that the output light from the first optical phase modulation unit is extinguished when the first n-ary data signal is a zero level. The second bias power supply generates a second bias voltage (e.g., $V_{bias2}$) for performing a setting so that the output light from the second optical phase modulation unit is extinguished when the second n-ary data signal is a zero level. The third bias power supply generates a third bias voltage (e.g., $V_{bias3}$) that is a bias voltage for adjusting the amount of a phase shift by the optical phase shifter. The optical power monitor monitors optical power of output light from the optical modulator. The control unit controls the first bias voltage generated by the first bias power supply, the second bias voltage generated by the second bias power supply, and the third bias voltage generated by the third bias power supply on the basis of the monitoring result by the optical power monitor.

In a start-up sequence of the bias control circuit, the control unit performs a loop process that fixes the second bias voltage and iterates a process of recording a pair of a first candidate bias voltage and a second candidate bias voltage that are the first bias voltage when the optical power is controlled so that the optical power converges to a value in the vicinity of the maximum value or the minimum value before and after the third bias voltage is increased or decreased by a half-wave voltage while changing the second bias voltage within a predetermined range. Alternatively, in the start-up sequence of the bias control circuit, the control unit performs a loop process that fixes the second bias voltage and iterates a process of applying dithering of a predetermined frequency to the amplitude of the first n-ary data signal or the first bias voltage and recording a pair of a first candidate bias voltage and a second candidate bias voltage that are the first bias voltage when control is performed so that a component of a frequency that is an integral multiple of a predetermined frequency superposed on the optical power converges to a value in the vicinity of zero, the maximum, or the minimum before and after the third bias voltage is increased or decreased by a half-wave voltage while changing the second bias voltage within a predetermined range. It is to be noted that because an n-ary data signal to which no dithering is applied is an RF signal, the n-ary data signal has an amplitude and the amplitude of the n-ary data signal to which dithering has been applied slightly increases or decreases. In contrast, a bias voltage has no amplitude because the bias voltage is DC, and the first bias voltage to which dithering has been applied is almost constant but it fluctuates with a slight amplitude. After performing any one of the above loop processes, the control unit performs a voltage determination process that calculates the difference between the first candidate bias voltage and the second candidate bias voltage for each of a plurality of recorded pairs and determines a value between the first candidate bias voltage and the second candidate bias voltage of a pair selected on the basis of the calculated difference, specifically, the average of the first candidate bias voltage and the second candidate bias voltage that are included in the selected pair, as the first bias voltage to be generated by the first bias power supply.

The control unit determines that the second bias voltage when the selected pair has been obtained is to be generated by the second bias power supply. Alternatively, the control unit may determine the second bias voltage by performing the above-described loop process and voltage determination process in which the first bias voltage and the second bias voltage are exchanged. The control unit performs existing auto bias control using the determined first bias voltage and the determined second bias voltage to control the third bias voltage and ends a start-up process of the bias control circuit. The Pockels effect or thermal expansion of optical waveguides is used to adjust the optical phases using the first bias voltage, the second bias voltage, and the third bias voltage.

According to the embodiments described above, it is possible to converge the biases to appropriate bias values without converging the biases to inappropriate values and maintain their states even for any initial values of the biases at the time of starting the operation of a control circuit and even when an imbalance in the operation of the modulator and/or interactions among the biases are not negligible in bias control circuits of optical modulators for a multi-level QAM using asymmetric bias dithering or its application.

Although embodiments of the present invention have been described in detail with reference to the drawings, the specific structures thereof are not limited to these embodiments, and design and the like that do not depart from the gist of the present invention are also included in the present invention.

INDUSTRIAL APPLICABILITY

The present invention is applicable to transmitters that generate multi-level QAM optical signals.

DESCRIPTION OF REFERENCE SYMBOLS

M . . . optical IQ modulator
1 . . . first optical coupler
2 . . . first optical phase modulation unit
3 . . . second optical phase modulation unit
4 . . . optical phase shifter
5 . . . second optical coupler
6 . . . first drive amplifier
7 . . . second drive amplifier
8 . . . first bias power supply
9 . . . second bias power supply
10 . . . third bias power supply
11 . . . optical splitter
12 . . . optical power monitor
61a, 61b . . . first drive signal electrode
71a, 71b . . . second drive signal electrode
81a, 81b . . . first data bias electrode
82 . . . first oscillator
83 . . . first adder
84 . . . first synchronous detection circuit
91a, 91b . . . second data bias electrode
92 . . . second oscillator
93 . . . second adder
94 . . . second synchronous detection circuit
100, 100a . . . optical transmitter
101 . . . orthogonal bias electrode
102 . . . third oscillator
103 . . . third synchronous detection circuit 203 . . . first differential output DC amplifier
204 . . . second differential output DC amplifier
301 . . . first switch
311 . . . second switch
400, 400a . . . bias control circuit
503 . . . third loop gain adjustment circuit
504 . . . first loop gain adjustment circuit
505 . . . second loop gain adjustment circuit
600, 600a . . . controller

The invention claimed is:

1. A bias control circuit that performs bias control of an optical modulator, wherein the optical modulator comprises:
a first optical phase modulation unit that changes the phase or intensity of input light in accordance with a first n-ary data signal, which takes n kinds of values;
a second optical phase modulation unit that changes the phase or intensity of input light in accordance with a second n-ary data signal, which takes n kinds of values;
an optical phase shifter that delays at least one of output light from the first optical phase modulation unit and output light from the second optical phase modulation unit to apply an optical phase difference of $+\pi/2$ or $-\pi/2$; and
a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal,
the bias control circuit comprises:
a first bias power supply that generates a first bias voltage for performing a setting so that the output light from the first optical phase modulation unit is extinguished when the first n-ary data signal is a zero level;
a second bias power supply that generates a second bias voltage for performing a setting so that the output light from the second optical phase modulation unit is extinguished when the second n-ary data signal is a zero level;
a third bias power supply that generates a third bias voltage for adjusting a phase shift amount of the optical phase shifter;
an optical power monitor that monitors optical power of output light from the optical modulator; and
a control unit that controls the first bias voltage generated by the first bias power supply, the second bias voltage generated by the second bias power supply, and the third bias voltage generated by the third bias power supply on the basis of a monitoring result by the optical power monitor, and
the control unit performs a loop process that fixes the second bias voltage and iterates a process of recording a pair of a first candidate bias voltage and a second candidate bias voltage that are the first bias voltage when the optical power is controlled so that the optical power converges to a value in the vicinity of the maximum value or the minimum value before and after the third bias voltage is increased or decreased by a half-wave voltage while changing the second bias voltage within a predetermined range, and performs a voltage determination process that calculates the difference between the first candidate bias voltage and the second candidate bias voltage for each of a plurality of recorded pairs and determines a value between the first candidate bias voltage and the second candidate bias voltage of a pair selected on the basis of the calculated difference as the first bias voltage to be generated by the first bias power supply.

2. A bias control circuit that performs bias control of an optical modulator, wherein the optical modulator comprises:
a first optical phase modulation unit that changes the phase or intensity of input light in accordance with a first n-ary data signal, which takes n kinds of values;
a second optical phase modulation unit that changes the phase or intensity of input light in accordance with a second n-ary data signal, which takes n kinds of values;
an optical phase shifter that delays at least one of output light from the first optical phase modulation unit and output light from the second optical phase modulation unit to apply an optical phase difference of $+\pi/2$ or $-\pi/2$; and
a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal,
the bias control circuit comprises:
a first bias power supply that generates a first bias voltage for performing a setting so that output light from the first optical phase modulation unit is extinguished when the first n-ary data signal is a zero level;
a second bias power supply that generates a second bias voltage for performing a setting so that output light from the second optical phase modulation unit is extinguished when the second n-ary data signal is a zero level;
a third bias power supply that generates a third bias voltage for adjusting a phase shift amount of the optical phase shifter;
an optical power monitor that monitors optical power of output light from the optical modulator; and
a control unit that controls the first bias voltage generated by the first bias power supply, the second bias voltage generated by the second bias power supply, and the third bias voltage generated by the third bias power supply on the basis of a monitoring result by the optical power monitor, and
the control unit performs a loop process that fixes the second bias voltage and iterates a process of applying dithering of a predetermined frequency to the amplitude of the first n-ary data signal or the first bias voltage and recording a pair of a first candidate bias voltage and a second candidate bias voltage that are the first bias voltage when control is performed so that a component of a frequency that is an integral multiple of the predetermined frequency superposed on the optical power converges to a value in the vicinity of zero, the maximum, or the minimum before and after the third bias voltage is increased or decreased by a half-wave voltage while changing the second bias voltage within a predetermined range, and performs a voltage determination process that calculates the difference between the first candidate bias voltage and the second candidate bias voltage for each of a plurality of recorded pairs and determines a value between the first candidate bias voltage and the second candidate bias voltage of a pair selected on the basis of the calculated difference as the first bias voltage to be generated by the first bias power supply.

3. The bias control circuit according to claim 1, wherein the control unit determines that the second bias voltage when the selected pair has been obtained is to be generated by the second bias power supply.

4. The bias control circuit according to claim 1, wherein the control unit performs the loop process and the voltage determination process after exchanging a procedure for the first bias voltage and a procedure for the second bias voltage, and determines the second bias voltage to be generated by the second bias power supply.

5. The bias control circuit according to claim 3, wherein the control unit controls the third bias voltage using the determined first bias voltage and the determined second bias voltage and ends a start-up process of the bias control circuit.

6. The bias control circuit according to claim 1, wherein the Pockels effect or heat expansion of optical waveguides is utilized when the first bias voltage, the second bias voltage, and the third bias voltage adjust optical phases.

7. A bias control method for an optical modulator that is executed by a bias control circuit, wherein the optical modulator comprises:
a first optical phase modulation unit that changes the phase or intensity of input light in accordance with a first n-ary data signal, which takes n kinds of values;
a second optical phase modulation unit that changes the phase or intensity of input light in accordance with a second n-ary data signal, which takes n kinds of values;
an optical phase shifter that delays at least one of output light from the first optical phase modulation unit and output light from the second optical phase modulation unit to apply an optical phase difference of $+\pi/2$ or $-\pi/2$; and
a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal, and
the bias control method comprises:
a bias voltage generation step in which in the bias control circuit, a first bias power supply generates a first bias voltage for performing a setting so that the output light from the first optical phase modulation unit is extinguished when the first n-ary data signal is a zero level, a second bias power supply generates a second bias voltage for performing a setting so that the output light from the second optical phase modulation unit is extinguished when the second n-ary data signal is a zero level, and a third bias power supply generates a third bias voltage for adjusting a phase shift amount of the optical phase shifter;
a bias voltage control step in which in the bias control circuit, a control unit controls the first bias voltage generated by the first bias power supply, the second bias voltage generated by the second bias power supply, and the third bias voltage generated by the third bias power supply on the basis of a monitoring result of optical power of output light from the optical modulator;
a loop processing step in which in the bias control circuit, the control unit fixes the second bias voltage and iterates a process of recording a pair of a first candidate bias voltage and a second candidate bias voltage that are the first bias voltage when the optical power is controlled so that the optical power converges to a value in the vicinity of the maximum value or the minimum value before and after the third bias voltage is increased or decreased by a half-wave voltage while changing the second bias voltage within a predetermined range; and
a voltage determination step in which in the bias control circuit, the control unit calculates the difference between the first candidate bias voltage and the second candidate bias voltage for each of a plurality of pairs recorded in the loop processing step and determines a value between the first candidate bias voltage and the second candidate bias voltage of a pair selected on the basis of the calculated difference as the first bias voltage to be generated by the first bias power supply.

8. A bias control method for an optical modulator that is executed by a bias control circuit, wherein the optical modulator comprises:
a first optical phase modulation unit that changes the phase or intensity of input light in accordance with a first n-ary data signal, which takes n kinds of values;
a second optical phase modulation unit that changes the phase or intensity of input light in accordance with a second n-ary data signal, which takes n kinds of values;
an optical phase shifter that delays at least one of output light from the first optical phase modulation unit and output light from the second optical phase modulation unit to apply an optical phase difference of $+\pi/2$ or $-\pi/2$; and
a combining unit that combines the output light from the first optical phase modulation unit and the output light from the second optical phase modulation unit, the optical phase difference by the optical phase shifter having been applied to at least one of the output light from the first optical phase modulation unit and the output light from the second optical phase modulation unit, and outputs a generated multi-level QAM signal, and
the bias control method comprises:
a bias voltage generation step in which in the bias control circuit, a first bias power supply generates a first bias voltage for performing a setting so that output light from the first optical phase modulation unit is extinguished when the first n-ary data signal is a zero level, a second bias power supply generates a second bias voltage for performing a setting so that output light from the second optical phase modulation unit is extinguished when the second n-ary data signal is a zero level, and a third bias power supply generates a third bias voltage for adjusting a phase shift amount of the optical phase shifter;
a bias voltage control step in which in the bias control circuit, a control unit controls the first bias voltage generated by the first bias power supply, the second bias voltage generated by the second bias power supply, and the third bias voltage generated by the third bias power supply on the basis of a monitoring result of optical power of output light from the optical modulator;
a loop processing step in which in the bias control circuit, the control unit fixes the second bias voltage and iterates a process of applying dithering of a predetermined frequency to the amplitude of the first n-ary data signal or the first bias voltage and recording a pair of a first candidate bias voltage and a second candidate bias voltage that are the first bias voltage when control is performed so that a component of a frequency that is an integral multiple of the predetermined frequency superposed on the optical power converges to a value in the vicinity of zero, the maximum, or the minimum before and after the third bias voltage is increased or decreased by a half-wave voltage while changing the second bias voltage within a predetermined range; and a voltage determination step in which in the bias control circuit, the control unit calculates the difference between the first candidate bias voltage and the second candidate bias voltage for each of a plurality of pairs recorded in the loop processing step and determines a value between the first candidate bias voltage and the second candidate bias voltage of a pair selected on the basis of the calculated difference as the first bias voltage to be generated by the first bias power supply.

9. The bias control circuit according to claim 2, wherein the control unit determines that the second bias voltage when the selected pair has been obtained is to be generated by the second bias power supply.

10. The bias control circuit according to claim 2, wherein the control unit performs the loop process and the voltage determination process after exchanging a procedure for the first bias voltage and a procedure for the second bias voltage, and determines the second bias voltage to be generated by the second bias power supply.

11. The bias control circuit according to claim 4, wherein the control unit controls the third bias voltage using the determined first bias voltage and the determined second bias voltage and ends a start-up process of the bias control circuit.

12. The bias control circuit according to claim 9, wherein the control unit controls the third bias voltage using the determined first bias voltage and the determined second bias voltage and ends a start-up process of the bias control circuit.

13. The bias control circuit according to claim 10, wherein the control unit controls the third bias voltage using the determined first bias voltage and the determined second bias voltage and ends a start-up process of the bias control circuit.

14. The bias control circuit according to claim 2, wherein the Pockels effect or heat expansion of optical waveguides is utilized when the first bias voltage, the second bias voltage, and the third bias voltage adjust optical phases.

15. The bias control circuit according to claim 3, wherein the Pockels effect or heat expansion of optical waveguides is utilized when the first bias voltage, the second bias voltage, and the third bias voltage adjust optical phases.

16. The bias control circuit according to claim 4, wherein the Pockels effect or heat expansion of optical waveguides is utilized when the first bias voltage, the second bias voltage, and the third bias voltage adjust optical phases.

17. The bias control circuit according to claim 9, wherein the Pockels effect or heat expansion of optical waveguides is utilized when the first bias voltage, the second bias voltage, and the third bias voltage adjust optical phases.

18. The bias control circuit according to claim 10, wherein the Pockels effect or heat expansion of optical waveguides is utilized when the first bias voltage, the second bias voltage, and the third bias voltage adjust optical phases.

19. The bias control circuit according to claim 5, wherein the Pockels effect or heat expansion of optical waveguides is utilized when the first bias voltage, the second bias voltage, and the third bias voltage adjust optical phases.

20. The bias control circuit according to claim 11, wherein the Pockels effect or heat expansion of optical waveguides is utilized when the first bias voltage, the second bias voltage, and the third bias voltage adjust optical phases.

21. The bias control circuit according to claim 12, wherein the Pockels effect or heat expansion of optical waveguides is utilized when the first bias voltage, the second bias voltage, and the third bias voltage adjust optical phases.

22. The bias control circuit according to claim 13, wherein the Pockels effect or heat expansion of optical waveguides is utilized when the first bias voltage, the second bias voltage, and the third bias voltage adjust optical phases.

* * * * *